United States Patent
Kawano et al.

(10) Patent No.: US 7,236,277 B2
(45) Date of Patent: Jun. 26, 2007

(54) HOLOGRAPHIC RECORDING MEDIUM AND HOLOGRAPHIC RECORDING METHOD USING THE SAME

(75) Inventors: Katsunori Kawano, Ashigarakami-gun (JP); Makoto Furuki, Ashigarakami-gun (JP); Jiro Minabe, Ashigarakami-gun (JP); Shin Yasuda, Ashigarakami-gun (JP); Hiroo Takizawa, Minamiashigara (JP); Kazuhiro Hayashi, Ashigarakami-gun (JP); Yasuhiro Ogasawara, Ashigarakami-gun (JP); Hisae Yoshizawa, Ashigarakami-gun (JP)

(73) Assignees: Fuji Xerox Co., Ltd., Tokyo (JP); Fuji Photo Film Co., Ltd., Kanagawa (JP)

( * ) Notice: Subject to any disclaimer, the term of this patent is extended or adjusted under 35 U.S.C. 154(b) by 364 days.

(21) Appl. No.: 10/984,759

(22) Filed: Nov. 10, 2004

(65) Prior Publication Data

US 2005/0206984 A1   Sep. 22, 2005

(30) Foreign Application Priority Data

Mar. 19, 2004 (JP) ............................ 2004-081669
Aug. 11, 2004 (JP) ............................ 2004-234760

(51) Int. Cl.
*G03H 1/02* (2006.01)
(52) U.S. Cl. .................... 359/3; 359/4; 359/24; 359/25; 430/1; 430/2
(58) Field of Classification Search .................... 359/3, 359/4, 24, 25; 430/1, 2
See application file for complete search history.

(56) References Cited

U.S. PATENT DOCUMENTS

| 5,023,859 | A | | 6/1991 | Eich et al. |
| 5,460,907 | A | * | 10/1995 | Ducharme et al. ............. 430/2 |
| 5,684,612 | A | * | 11/1997 | Wilde et al. ................... 359/7 |
| 6,023,352 | A | * | 2/2000 | Haskal .......................... 359/3 |
| 6,512,085 | B1 | | 1/2003 | Minabe et al. |
| 6,747,768 | B1 | * | 6/2004 | Knocke et al. ................ 359/2 |
| 7,067,230 | B2 | * | 6/2006 | Cammack et al. ....... 430/270.1 |
| 2004/0043301 | A1 | * | 3/2004 | Hirao et al. ................... 430/2 |
| 2004/0120020 | A1 | * | 6/2004 | Hatano et al. ................. 359/3 |

FOREIGN PATENT DOCUMENTS

| JP | B2 2834470 | 10/1998 |
| JP | A 2000-105529 | 4/2000 |
| JP | A 2000-109719 | 4/2000 |
| JP | A 2000-264962 | 9/2000 |
| JP | A 2001-201634 | 7/2001 |
| JP | A 2001-294652 | 10/2001 |

OTHER PUBLICATIONS

G. Barbastathis and D. Psaltis, "Volume holographic multiplexing methods" in "Holographic Data Storage", H.J. Coufal, D. Psaltis and G.T. Sincerbox Eds., pp. 35-42, Springer, 2000.*

* cited by examiner

*Primary Examiner*—Leonidas Boutsikaris
(74) *Attorney, Agent, or Firm*—Oliff & Berridge PLC

(57) ABSTRACT

A holographic recording medium has at least a recording layer with a thickness of L which comprises a recording layer material having an absorption coefficient of α and containing a photorefractive material, wherein the optical density αL represented by the product of the absorption coefficient α and the thickness L is in the range from 0.3 to 2.0.

4 Claims, 9 Drawing Sheets

FIG.6
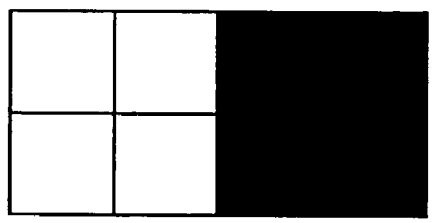 
1                                         0

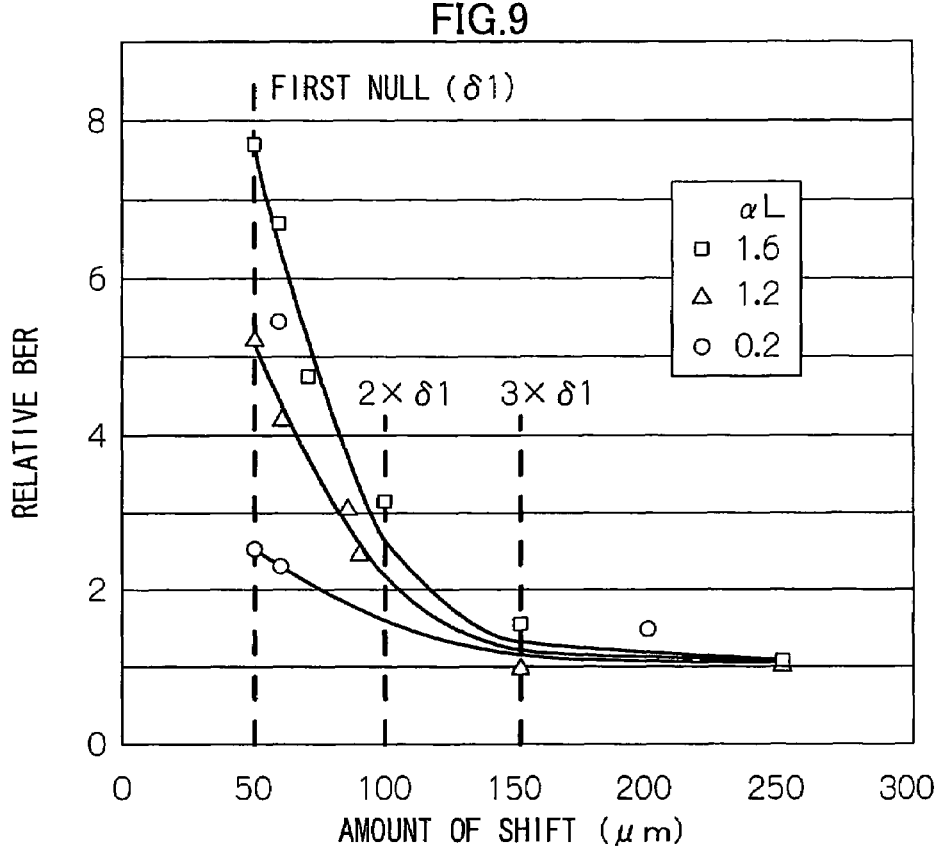
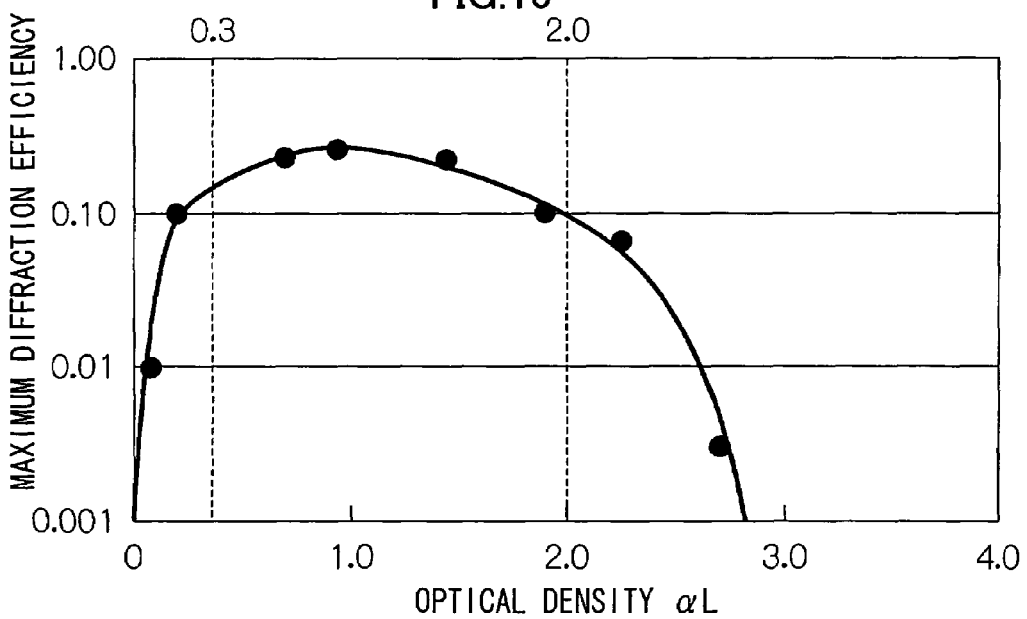

HOLOGRAPHIC RECORDING MEDIUM AND HOLOGRAPHIC RECORDING METHOD USING THE SAME

CROSS-REFERENCE TO RELATED APPLICATION

This application claims priority under 35 USC 119 from Japanese Patent Application Nos. 2004-81669 and 2004-234760, the disclosures of which are incorporated by reference herein.

BACKGROUND OF THE INVENTION

1. Field of the Invention

The present invention relates to a holographic recording medium and a holographic recording method using the same.

2. Description of the Related Art

In recent years, research has been actively conducted with respect to holographic recording, owing to its potential for high density recording, multiplexed recording, and the like. Within holographic recording, amplitude holograms based on a change in the transmittance of a recording materials, phase holograms based on a change in the refractive index, or structural irregularity of a recording material, among other techniques, are known.

Among recording materials for use in such holographic recording, much research has been conducted on photorefractive index-changing materials (hereinafter sometimes abbreviated as "photorefractive materials") which change their refractive index when light is applied to them. In particular, organic photorefractive materials have been actively researched, since they can be easily worked into any shape and their sensitive wavelength can be easily controlled.

In photorefractive materials, charges are generated by the application of light and move to become trapped, producing an inner electric field, whereby Pockels effect takes place and thus a change in the refractive index is caused. This change in the refractive index forms a hologram. When organic photorefractive materials are used, however, orientation of the organic molecules and application of an outer electric field are required for effective production of Pockels effect. The need for an outer electric field is a significant problem when considering applications.

Holographic materials needing no outer electric field are known, a representative example of which being organic photoisomerizable materials having an azobenzene structure as a photoisomerizable group, particularly photoisomerizable polymer materials (for example, see Japanese Patent No. 2834470 and Japanese Patent Application Laid-Open (JP-A) Nos. 2001-201634, 2000-105529, 2000-109719, 2000-264962, and 2001-294652). The photoisomerization reaction of the azobenzene plays an important role in holographic recording. When linearly polarized light is applied to the azopolymer, the azobenzene is reoriented through the trans-cis-trans isomerization cycle. This reorientation induces optical anisotropy, specifically dichroism and birefringence, so that holographic recording can be performed.

In terms of factors including convenience, holographic recording is performed using a holographic recording medium that structured such that a recording layer is provided on a given substrate, board, or the like and the recording layer contains a holographic recording material. When holographic recording is performed using a photoisomerizable material, a light beam corresponding to information to be recorded is applied to the recording layer, after which the photoisomerizable material in the recording layer absorbs the light and changes its refractive index.

In the process of holographic recording, the absorption of light by the photoisomerizable material can cause a loss in holographic diffraction efficiency and can ultimately cause, for example, a reduction in reproduction output. To reduce loss in diffraction efficiency, for example, the content of azobenzene in the photoisomerizable material may be reduced. However, a low azobenzene content in the photoisomerizable material can lead to a reduction in the photosensitivity of the holographic recording material and thus can lead to an inability to carry out holographic recording itself.

The present invention has been devised in view of the above problems. The invention provides a holographic recording medium with which high diffraction-efficiency recording/reproduction can be performed independently from the optical properties of the photorefractive material, and also provides a holographic recording method using such a medium.

The invention further provides a holographic recording method by which multiplexed recording of information can be performed at high density and a high SNR (low error rate).

SUMMARY OF THE INVENTION

The present invention has been made in view of the above circumstances. A first aspect of the invention is to provide a holographic recording medium, comprising at least a recording layer with a thickness of L which comprises a recording layer material having an absorption coefficient of $\alpha$ and containing a photorefractive material, wherein the optical density $\alpha L$ represented by the product of the absorption coefficient $\alpha$ and the thickness L is in the range from 0.3 to 2.0.

A second aspect of the invention is to provide a holographic recording method, comprising the step of applying light for recording or reproduction to a holographic recording medium comprising at least a recording layer with a thickness of L which comprises a recording layer material having an absorption coefficient of $\alpha$ and containing a photorefractive material, wherein the optical density $\alpha L$ represented by the product of the absorption coefficient $\alpha$ and the thickness L is in the range from 0.3 to 2.0.

BRIEF DESCRIPTION OF THE DRAWINGS

FIG. 6 is a schematic view for illustrating a recording method based on a differential coding method.

FIG. 9 is a graph showing changes in bit error rate against the amounts of shift of the holographic recording media of Example 1/Comparative Example 1.

FIG. 10 is a graph showing changes in diffraction efficiency against the optical densities αL of the holographic recording media of Example 2/Comparative Example 2.

DETAILED DESCRIPTION OF THE INVENTION

<Holographic Recording Medium>

Figure 1:
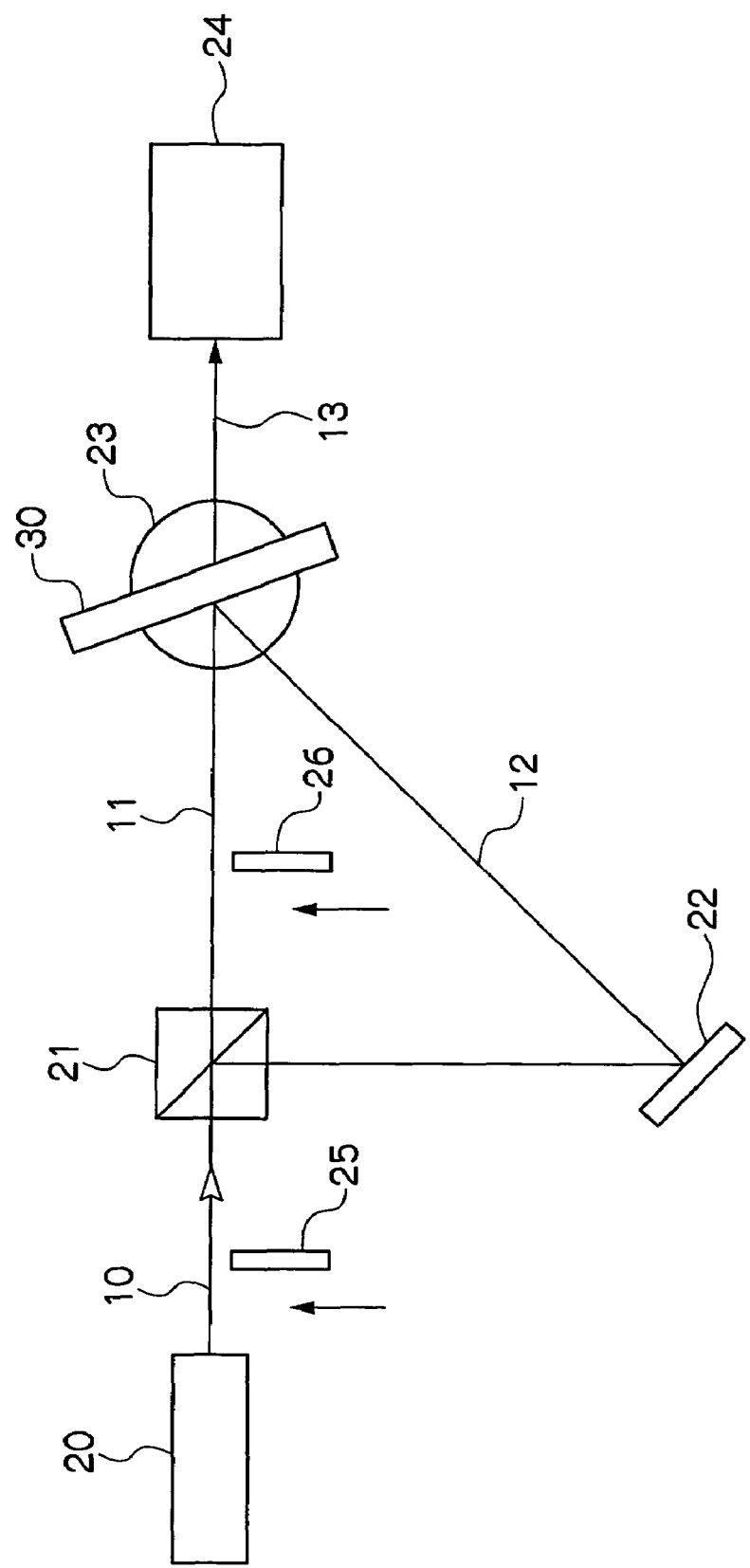
FIG. 1 is a schematic diagram for illustrating the principle of recording and reproduction with a holographic recording medium.

The holographic recording medium of the present invention comprises at least a recording layer with a thickness of L which comprises a recording layer material having an absorption coefficient of α and containing a photorefractive material, wherein the optical density αL represented by the product of the absorption coefficient α and the thickness L is in the range from 0.3 to 2.0.

The diffraction efficiency should be at least 0.1 for the purpose of achieving high-density multiplexed recording on a holographic recording medium. In the case of multiplexed recording of information, the diffraction efficiency is inversely proportional to the square of multiplicity N. When 100 multiplexed recording is performed on a holographic recording medium with a maximum diffraction efficiency of 0.1, the diffracted light for each piece of recorded information will be $10^{-5}$. On the other hand, a diffraction efficiency of $10^{-5}$ or more is generally necessary for the production of detectable light intensity during reproduction. Thus, the diffraction efficiency should be at least 0.1 for the purpose of achieving an adequate multiplicity of at least 100 for high density recording, and it is known that in principle, the diffraction efficiency should preferably be as high as possible (for example, see H. J. Coufal, D. Psaltis, G. T. Sincerbox eds., Holographic Data Storage, Springer, 2000).

The holographic recording medium of the invention as stated above has an optical density αL of from 0.3 to 2.0 and thus can have a diffraction efficiency of 0.1 or more. In terms of achieving higher diffraction efficiency, the optical density αL is preferably from 0.5 to 1.5.

Besides the absorption coefficient of the recording layer material, the thickness of the recording layer may also be controlled so that the holographic recording medium of the invention can have high diffraction efficiency. Thus, the diffraction efficiency of the holographic recording medium does not depend only on the absorption coefficient of the recording layer material, so that the degree of design flexibility can be very high in manufacturing the holographic recording medium. Thus, the range of choice of the photorefractive material for use in the recording layer can also be significantly wider.

In the invention, the optical density αL may be a value derived by transformation of Formula (3):

$$i = i_o e^{-\alpha L}$$

wherein $i_o$ represents the intensity of incident light (light coming perpendicular to the recording layer), i represents the intensity of transmitted light (light after coming perpendicular to the recording layer and passing through the recording layer), α represents the absorption coefficient ($cm^{-1}$) of the recording layer material, and L represents the thickness (cm) of the recording layer.

Thus, the optical density αL may be calculated using Formula (3), and if the thickness L is known, the absorption coefficient α can be calculated. Specifically, the optical density αL may be measured based on formula (3) as follows.

The intensity $P_o$ of a probe beam directly applied from a light source (before coming into the measuring object, the holographic recording medium) is first measured with an optical power meter. The source of the probe beam for use in the measurement should use the same wavelength as that of the beam (generally a laser beam) for use in recording or reproducing information. The intensity $P_o$ of the probe beam should be controlled to be so weak that it will not change the refractive index of the recording layer in the holographic recording medium (in the case of a laser beam, the power of the light source should be approximately few μW or less.)

The holographic recording medium is then placed on the path of the probe beam, and the intensity P of the transmitted beam is measured. In the measurement, the transmitted beam with the intensity P and the incident beam with the intensity $P_o$ have the same cross-sectional beam area. Thus, substitution of the intensities P and $P_o$ for i and $i_o$, respectively, in Formula (3) yields αL.

If the recording layer material consists of a single type of photorefractive material, the absorption coefficient α may be replaced with the absorption coefficient α' of the photorefractive material.

If the recording layer material comprises two or more types of photorefractive materials or comprises a mixture of a photorefractive material and any other material such as a binder resin, the absorption coefficient α of the recording layer material may be determined in such a mixed state. Such a recording layer material is described in detail later.

If multiplexed recording is performed on the recording layer of the holographic recording medium, first, second, third, fourth . . . pieces of information corresponding to first, second, third, fourth . . . signal beams, respectively, should be separated by a constant spacing such that crosstalk, which would otherwise cause data degradation (an increase in bit error), can be minimized between the pieces of recorded information. Herein, the term "a constant spacing" means a value where the positions of the information pieces recorded on the recording layer corresponding to the respective signal beams do not match the Bragg condition.

As a result of active investigations of the inventors, however, it has been found that the recording layer with a too-high optical density αL can cause a problem of an increase in crosstalk, even if the recording spacing is optimized such that crosstalk can be minimized as described above for the purpose of multiplexed recording.

If multiplexed recording is performed, therefore, the optical density αL should preferably be 1.5 or less, more preferably 1.2 or less. If the optical density αL is more than 1.5, crosstalk can increase so that the information recorded by multiplexed recording cannot properly be reproduced in some cases.

If the optical density αL is too low in multiplexed recording, the diffraction efficiency can be so low that recording or reproduction itself can be difficult. Thus, the optical density αL is essentially 0.3 or more, preferably 0.5 or more.

Photorefractive Material

The photorefractive material for use in the holographic recording medium of the invention is described in detail below. The photorefractive material for use in the holographic recording medium of the invention may be any known material that changes its refractive index when light is applied to it.

For example, an inorganic photorefractive material may be used, including an inorganic ferroelectric crystal material such as barium titanate, lithium niobate and bismuth silicate. In terms of easiness of shaping and easiness of control of sensitive wavelength, an organic photorefractive material is preferably used. In the invention, a macromolecular or low-molecular material having a photoisomerizable group is more preferably used, which needs no outer electric field for a change in refractive index.

The absorption coefficient α' of the photorefractive material for use in the invention is preferably in the range from 1.5 to 6800 cm$^{-1}$, more preferably in the range from 10 to 500 cm$^{-1}$. If the absorption coefficient α' exceeds 6800 cm$^{-1}$, the macromolecular material with the photoisomerizable group used as the photorefractive material can have a high content of the photoisomerizable group and can have an associated form so that its photo-responsivity can be degraded. If the absorption coefficient α' is less than 1.5 cm$^{-1}$, the macromolecular material with the photoisomerizable group used as the photorefractive material can have a too-low content of the photoisomerizable group so that its recording properties can be degraded.

A relatively inexpensive semiconductor laser can be used as the light source, and it can be used in combination with any other optical device or the like. Thus, the light for use in recording/reproduction preferably has a wavelength of 350 to 800 nm, more preferably a wavelength of 400 to 650 nm. Therefore, the photorefractive material for use in the invention is preferably a material that changes its refractive index in response to a wavelength in such a range.

The organic photorefractive material for use in the invention is described in more detail below.

The organic photorefractive material may be an organic material that has a partial structure capable of causing isomerization (such as cis-trans isomerism and syn-anti isomerism) by the application of light and causes a change in refractive index by the isomerization of the partial structure.

In the invention, the photorefractive material preferably has an azobenzene structure (a structure comprising an azo group and benzene rings provided at both ends of the azo group) capable of causing cis-trans isomerization by the application of light. Such cis-trans isomerization of an azobenzene structure is shown as Isomerization Example 1 below.

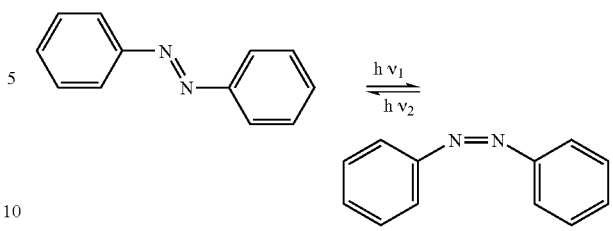

In the case of a photorefractive polymer material, the photoisomerizable group (which refers to a group that causes an isomerization reaction by the application of light) having an azobenzene structure or the like is preferably contained in its side chain moiety. Such a polymer material molecule can be designed in various ways with respect to its main and side chain structures, respectively, and thus has a merit that not only its absorption coefficient but also its various physical properties necessary for holographic recording, such as its sensitive wavelength range, its speed of response and its record retention properties can easily be controlled to the desired values at a high level. In addition to the photoisomerizable group, for example, a liquid-crystalline linear mesogen group such as a biphenyl derivative may be introduced into the side chain. In such a case, the change in the orientation of the photoisomerizable group by the application of light can be enhanced or fixed so that the loss in absorption can be suppressed.

Preferred examples of the polymer material having the azobenzene structure or the like include the polymer materials disclosed in Japanese Patent Application Nos. 2004-150801, 2004-113463, 2004-163889, 2004-83716, 2004-81670, 2004-135949, 2004-135950, and 2004-81610.

Besides the azobenzene structure-containing materials, diarylethene type materials may be used as the photorefractive material. Diarylethenes can exhibit photochromism. Such photochromism is a 6π-electron ring reaction in which the conversion is caused only by light similarly to fulgide or the like. Diarylethenes may be classified as a type of stilbene. The photochromism of the diarylethenes is cis-trans isomerization and characterized in that its thermal stability and repeat durability are high. The chemical structural formula of a typical diarylethene and an example of its isomerization reaction (Isomerization Example 2) are shown below.

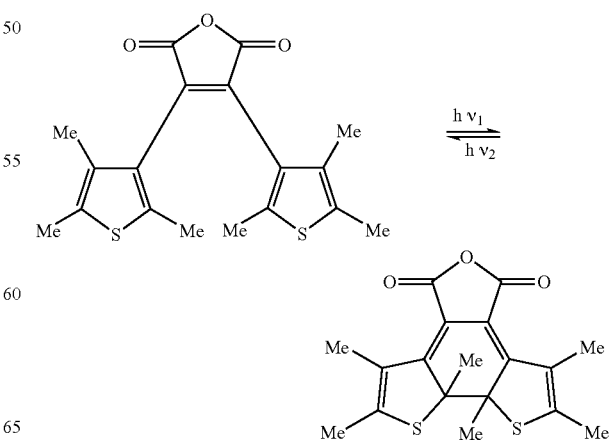

For example, the holographic recording medium may have a recording layer comprising a dispersion of diarylethene in polyvinyl alcohol (PVA), polymethylmethacrylate (PMMA) or the like. The recording layer of this holographic recording medium becomes colorless by the application of light of about 500 nm in wavelength and develops a color by the application of light of about 360 nm in wavelength. Holographic recording can be performed using such a change in absorption.

Spiropyran type materials may also be used as the photorefractive material. Spiropyrans are the mostly researched and reported photochromic compounds. Some of the spiropyrans are in the actual use, and the spiropyrans are one of the most promising compounds. The chemical structural formula of a typical spiropyran and an example of its isomerization reaction (Isomerization Example 3) are shown below.

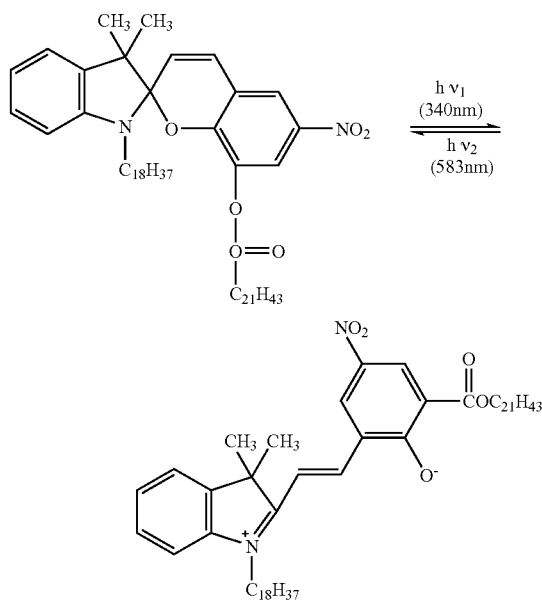

Spiropyrans shows a blue color through the application of light and can produce good contrast. Spiropyran-containing polymer materials are typically characterized in that: ultraviolet light can turn them from colorless to colored; the coloring speed is high; and the color is slowly fading when they are allowed to stand in a dark place. The spiropyrans with such characteristics may be used as the photorefractive material for the holographic recording medium of the invention.

Other examples thereof include xanthene dyes such as uranine, Erythrosine B and Eosine Y. The chemical structural formula of a typical xanthene dye, uranine, and an example of its isomerization reaction (Isomerization Example 4) are shown below. If a xanthene dye is used, recording of information on a holographic recording medium can be performed even with a relatively low-intensity light beam. When the holographic recording medium is produced with the xanthene dye, a dispersion of the xanthene dye in PVA, PMMA or the like may be used.

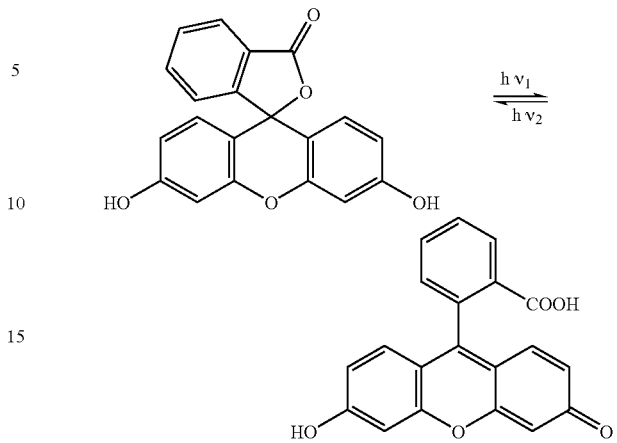

Fulgide type materials may also be used as the photorefractive material. The chemical structural formula of a typical fulgide and an example of its isomerization reaction (Isomerization Example 5) are shown below. Fulgide develops a color by the application of ultraviolet light with a wavelength of 365 nm and is isomerized by the application of green light with a wavelength of 515 nm or 532 nm. Thus, such characteristics may be applied to the holographic recording medium.

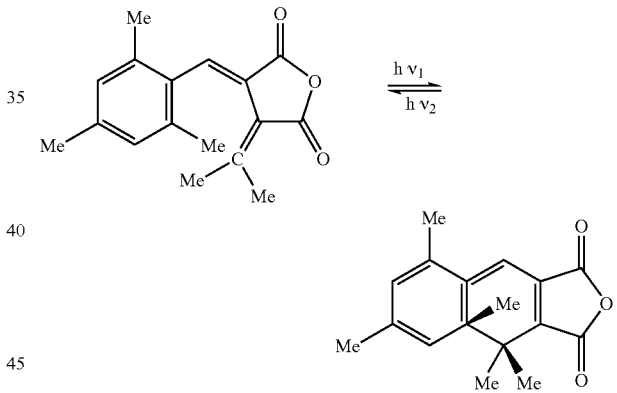

Photochromic compound-containing polymer materials other then the azobenzene structure-bearing materials may also be used as the photorefractive material in the invention. Preferred examples of such other materials include the materials disclosed in Japanese Patent Application No. 2004-81666. Preferred examples of other photorefractive materials include the materials disclosed in Japanese Patent Application Nos. 2003-298936, 2003-300059, 2003-300057, 2004-88790, and 2004-91983, 2004-238077, 2004-238427, 2004-238392, 2003-327594, 2004-269796.

Structure of the Holographic Recording Medium and Method of Manufacturing the Same The structure of the holographic recording medium of the invention is described below. The holographic recording medium of the invention comprises at least a recording layer that contains the photorefractive material as described above. The recording layer is preferably formed on a substrate (or a base material). A reflection layer may be provided between the recording layer and the substrate. A protective layer for protecting the recording layer may also provided on the recording layer side opposite to the side where the substrate is provided. Alternatively, the substrate may serve as the protective layer (specifically, a structure comprising a pair of substrates and a recording layer provided therebetween). If desired, an intermediate layer may also be provided for the purpose of ensuring the adhesion between the substrate and the reflection layer or the recording layer or ensuring the adhesion between all of the reflection layer, the recording layer and the protective layer.

The holographic recording medium may be in any selected shape such as a disc shape, a sheet shape, a tape shape, and a drum shape, as long as the recording layer is two-dimensionally formed with a constant thickness.

However, a disc shape having a hole at its center (as used for conventional optical recording media) is preferred, because existing manufacturing technology for optical recording media and existing recording/reproduction systems can easily be applied.

Substrate/Base Material

Any material may be selected and used as the substrate or the base material, as long as it can form a smooth surface. For example, metals, ceramics, resins, paper, and the like may be used. It may also be in any shape. A disc-shaped flat substrate having a hole at its center (as used for conventional optical recording media) is preferably used, because existing manufacturing technology for optical recording media and existing recording/reproduction systems can easily be applied.

Examples of such a substrate material include glass, polycarbonate, acrylic resin such as polymethylmethacrylate, vinyl chloride resin such as polyvinyl chloride and vinyl chloride copolymer, epoxy resin, amorphous polyolefin, polyester, and metals such as aluminum. If desired, any of these materials may be used in combination.

In terms of resistance to moisture, dimensional stability and low cost, amorphous polyolefin and polycarbonate are preferred, and polycarbonate is particularly preferred.

A guide groove for tracking or irregularities (pre-grooves) representing information such as address signals may be formed on the surface of the substrate.

In a case where light for recording or reproduction will be applied to the recording layer through the substrate, the applicable material should transmit the range of the wavelength of the applicable light (recording light and reproducing light). In this case, the transmittance is preferably 90% or more with respect to the range of the wavelength of the applicable light (around the range of the wavelength with a maximum intensity in the case of a laser beam).

In the process of forming a reflection layer on the substrate surface, an undercoat layer is preferably formed on the substrate surface for the purpose of improving flatness and adhesion strength.

Examples of the material for the undercoat layer include a polymer material such as polymethylmethacrylate, acrylic acid-methacrylic acid copolymer, styrene-maleic anhydride copolymer, polyvinyl alcohol, N-methylolacrylamide, styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, polycarbonate; and a surface modifying agent such as a silane coupling agent.

The undercoat layer may be formed by a process including the steps of dissolving or dispersing any of the above materials in an appropriate solvent to form a coating liquid and applying the coating liquid to the substrate surface by such a coating method as spin coating, dip coating and extrusion coating. In general, the thickness of the undercoat layer is preferably from 0.005 µm to 20 µm, more preferably from 0.01 µm to 10 µm.

Reflection Layer

The reflection layer is preferably made of a light-reflecting material having a reflectance of at least 70% with respect to a laser beam. Examples of such a light-reflecting material include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and stainless steels.

One of these light-reflecting materials may be used alone, or two or more of these materials may be combined and used in the form of an alloy. Preferred are Cr, Ni, Pt, Cu, Ag, Au, Al, and stainless steels; Particularly preferred are Au, Ag, Al, and any alloy thereof; Most preferred are Au, Ag and any alloy thereof.

For example, the reflection layer may be formed on the substrate by vapor deposition, sputtering or ion-plating of any of the above light-reflecting materials. In general, the thickness of the reflection layer is preferably from 10 nm to 300 nm, more preferably from 50 nm to 200 nm.

Protective Layer

Any known material may be used to form the protective layer, as long as it can have a certain thickness and can protect the recording layer mechanically, physically and chemically under normal use conditions. For example, a transparent resin or a transparent inorganic material such as $SiO_2$ may be used for the protective layer.

In a case where light for recording or reproduction will be applied to the recording layer through the protective layer, the applicable material should transmit the range of the wavelength of the applicable light. In this case, the transmittance is preferably 90% or more with respect to the range of the wavelength of the applicable light (around the range of the wavelength with a maximum intensity in the case of a laser beam). The same applies to the intermediate layer, which may be provided on the incident-light-side surface of the recording layer for the purpose of improving adhesion or the like.

The protective layer may be made of a resin. In such a case, a resin film comprising polycarbonate or cellulose triacetate previously shaped into a sheet may be used and bonded onto the recording layer to form the protective layer. The bonding process preferably include the steps of bonding the film with a thermosetting or UV-curable adhesive for ensuring adhesion strength and curing the adhesive by heat treatment or UV radiation. While the resin film for use as the protective layer may have any thickness as long as it can protect the recording layer, it preferably has a thickness of 30 µm to 200 µm, more preferably of 50 µm to 150 µm, in terms of practical use.

Alternatively, a thermoplastic resin, a thermosetting resin, or a photo-setting resin may be applied in place of the resin film in order to form the protective layer.

The protective layer may be made of a transparent ceramic material such as $SiO_2$, $MgF_2$, $SnO_2$, and $Si_3N_4$ or a glass material. In such a case, the protective layer may be formed by a sputtering method or a sol-gel method. While the protective layer of the transparent inorganic material may have any thickness as long as it can protect the recording layer, it preferably has a thickness of 0.1 µm to 100 µm, more preferably of 1 µm to 20 µm, in terms of practical use.

Recording Layer

The absorption coefficient α of the recording layer material and the thickness L of the recording layer may each set such that the optical density αL is in the range from 0.3 to 2.0 (preferably in the range from 0.5 to 1.5 in the case that multiplexed recording will be performed).

The absorption coefficient α is preferably in the range from $1.5 \text{ cm}^{-1}$ to $6800 \text{ cm}^{-1}$. If the recording layer material consists only of the photorefractive material, the absorption coefficient α is equal to the absorption coefficient α' of the photorefractive material.

In terms of practical use, the thickness L of the recording layer is preferably in the range from 3 μm to 2 mm, more preferably in the range as stated below, depending on the type of the holographic recording medium, which may be determined by the relation between the thickness L of the recording layer and the spacing between interference fringes recorded on the recording layer.

In a case where the holographic recording medium of the invention is for plane hologram (in a case where the thickness L of the recording layer is substantially equal to or less than the spacing between interference fringes recorded on the recording layer), the thickness L is preferably from 3 μm to 100 μm, more preferably from 5 μm to 20 μm.

In a case where the holographic recording medium of the invention is for volume hologram (in a case where the thickness L of the recording layer is substantially equal to or at least several times the spacing between interference fringes recorded on the recording layer), the thickness L is preferably from 100 μm to 2 mm, more preferably from 250 μm to 1 mm.

The recording layer contains at least the photorefractive material as described above. The whole of the recording layer material may consist only of the photorefractive material. If desired, however, the photorefractive material may be used in combination with any other material(s). For example, a low-molecular organic photorefractive material may be used in combination with a binder resin.

Polymethacrylate (PMMA) or polyvinyl alcohol having good optical properties may be used as the binder resin. The polyester material having cyanobiphenyl in its side chain, as represented by Structural increased. The term "combination" refers to not only physical mixing of the photorefractive material with the photoisomerizable group and the polyester represented by Structural Formula (1) but also chemical mixing of them, specifically, the case that the repeating unit represented by Structural Formula (1) is contained in the photorefractive material (polymer) having the photoisomerizable group (and forms a copolymer).

The recording layer may be formed using any known method depending on the type of the recording layer material.

For example, the recording layer comprising the inorganic photorefractive material as described above may be formed using a sputtering method, a CVD (Chemical Vapor Deposition) method, a sol-gel method, or the like. The recording layer comprising the macromolecular and/or low-molecular organic photorefractive material may be produced with a coating liquid of a solution of any of the above materials by a liquid-phase coating method such as a spray method, a spin coating method, a dipping method, a roll coating method, a blade coating method, a doctor roll method, and a screen printing method; or by a vapor deposition method.

However, the thickness of the recording layer formed by these methods can be insufficient for the production of a volume hologram type holographic recording medium. In such case, it is preferred that a macromolecular photorefractive material should be used and formed into a plate-shaped recording layer through injection molding or hot press. If such a method is used, the recording layer can easily be formed with a thickness of 0.1 mm or more, which is necessary for the volume hologram type holographic recording medium.

In the case that such a plate-shaped recording layer is used in preparing the holographic recording medium, the recording layer may be sandwiched between a pair of substrates, or the recording layer itself may be the holographic recording medium if it is thick and has sufficient stiffness and strength.

A description is provided below of a method of manufacturing the holographic recording medium configured as described above according to the invention.

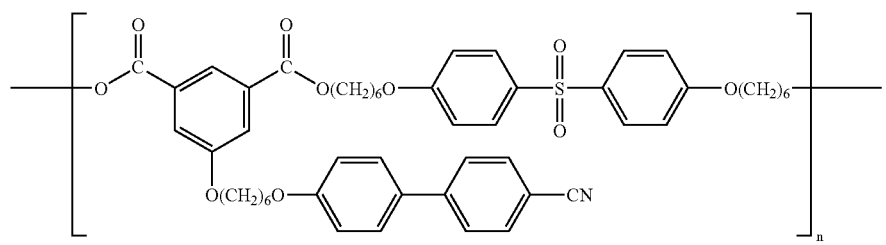

Formula (1) below, is also preferably used as the binder resin.

In Structural Formula (1), n represents an integer. This polyester material has transparency in the wavelength range of a light beam generally used for recording/reproducing information on/from a holographic recording medium. This polyester material may be used in combination with the photorefractive material having a photoisomerizable group. In such a case, birefringence can be induced by the isomerization of the photoisomerizable group, and therefore, the sensitivity of the photorefractive material can effectively be The holographic recording medium for plane hologram according to the invention may be manufactured by sequentially stacking the recording layer and any other layer on the substrate depending on the material for each layer.

For example, a brief description is provided below of the main flow of a process of manufacturing the holographic recording medium comprising a recording layer and a protective layer each provided on a substrate. First, a coating solution of a photorefractive polymer material in a solvent is used to form a recording layer with the desired thickness on a polycarbonate substrate through a spin coating method, and sufficiently dried. Next, a UV-curable adhesive is uniformly applied to the recording layer by a spin coating method, and then the recording layer is bonded to a cellulose triacetate resin film for forming a protective layer. UV light is then applied to solidify the adhesive, so that a holographic recording medium can be obtained which comprises a structure of the protective layer/the recording layer/the substrate.

The holographic recording medium for volume hologram according to the invention may be manufactured as shown below, wherein the recording layer may be formed by injection molding or hot press.

In the case that injection molding is used, the holographic recording medium may be manufactured as follows. First, injection molding is performed to form a disc-shaped material for use as a recording layer. The disc-shaped material is then sandwiched between a pair of disc-shaped transparent substrates, and they are laminated by hot press and bonded with a hot melt adhesive.

In the process of injection molding, a starting material resin (a resin containing at least a photorefractive polymer material) is heated and melted, and the melted resin is injected into a molding die and molded into the form of a disc. The injection molding machine may be any of an inline type injection molder with a material-plasticizing function and an injection function integrated with each other and a pre-plunger type injection molder with the plasticizing function and the injection function separated from each other. The injection molding is preferably performed under the conditions of an injection pressure of 1000 to 3000 kg/cm$^2$ and an injection speed of 5 to 30 mm/sec.

In the hot press process, the thick plate-shaped material produced by the injection molding process is sandwiched between a pair of transparent disc-shaped substrates, and they are hot-pressed under vacuum.

In the holographic recording medium prepared as described above, the recording layer is not a film formed on the substrate but a member independently formed by injection molding. Such a recording layer can easily be made thick, and such a holographic recording medium is suited for mass production. In addition, the residual strain of the injection-molded material is made even in the process of laminating the recording layer and the transparent substrate by hot press. Even if a thick recording layer is produced, therefore, the recording characteristics will not be degraded by the effect of light absorption or scattering.

In the case that hot press is used, for example, the holographic recording medium may be prepared as follows. A powdered resin (a resin containing at least the photorefractive polymer material) is sandwiched between highly-releasable substrates (pressing members) such as Teflon® sheets and hot-pressed under vacuum in this state to form a recording layer directly.

In the hot press process, vacuum hot press is preferably performed. In such a case, a powdered resin material is packed between a pair of pressing members. The pressure is then reduced to about 0.1 MPa for the purpose of preventing bubbles from forming, while the material is gradually heated to a specific temperature and pressed through the pressing members. In this process, the heating temperature is preferably at least the glass transition temperature (Tg) of the resin material, and the pressing pressure is preferably from 0.01 to 0.1 t/cm$^2$. After the hot press is performed for a given time period, the heating and the pressing are stopped, and the material is cooled to room temperature and then taken out.

When the hot press is performed, the resin material sandwiched between the pair of pressing members is heated and melted, and the melt is cooled to form a plate-shaped recording layer. Finally, the pressing members are removed so that an optical recording medium is obtained. For example, when the recording layer is produced with an azopolymer, which has a low Tg of about 50° C., the polymer is heated to about 70° C. and hot-pressed so that the recording layer can easily be formed with the desired thickness. The hot press does not cause residual strain.

If desired, the protective layer or the like may be formed for the purpose of increasing the damage or humidity resistance of the holographic recording medium of this recording layer.

In the holographic recording medium prepared as described above, the recording layer is not a film formed on the substrate but a member independently formed by hot press. Such a recording layer can easily be made thick. In addition, the recording layer shaped by hot press can be free from residual strain or the like. Even if a thick recording layer is produced, therefore, the recording characteristics will not be degraded by the effect of light absorption or scattering.

Holographic Recording Method

A description is provided below of the holographic recording method using the holographic recording medium of the invention.

The invention is also directed to a holographic recording method, comprising applying light for recording or reproduction to a holographic recording medium comprising at least a recording layer with a thickness L which comprises photorefractive index-changing material as a recording layer material having an absorption coefficient α, wherein the optical density αL expressed by the product of the absorption coefficient α and the thickness L is in a range from 0.3 to 2.0.

In the holographic recording method, the recording is performed by applying signal light at a first incident angle and reference light at a second incident angle different from the first incident angle simultaneously to the recording layer, wherein if the reference light is applied at two or more different angles to the recording layer for the purpose of angle-multiplexed storage, first reference light entering the recording layer at a first angle forms an angle Δθ with second reference light entering the recording layer at a second angle different from the first angle, wherein the angle Δθ (space between multiplexed angles) satisfies Formula (1):

$$\Delta\theta \geq n \cdot \lambda / (L \cdot \sin\theta) \quad (1)$$

wherein Δθ represents an angular space (deg) between multiplexed angles, n represents an integer of 2 or more, λ represents the wavelength (μm) of the signal and reference lights applied at the time of recording, L represents the thickness (μm) of the recording layer, and θ represents an angle (deg) which the first reference light forms with the signal light applied to the recording layer at the time of information recording.

In the holographic recording method, the value of n in Formula (1) is 2 when the optical density αL is in a range from 0.3 to 1.1.

In the holographic recording method, the value of n in Formula (1) is 3 when the optical density αL is in a range from more than 1.1 to not more than 2.0.

In the holographic recording method, the recording is multiplexed recording in which the signal light at the first incident angle and the reference light at the second incident angle different from the first incident angle are applied simultaneously to the recording layer, wherein when the multiplexed recording is performed by: maintaining a constant angle formed between the signal light and the reference light; and relatively shifting at least one of the holographic recording medium and the signal and reference light, a relative distance between a first place where a first piece of information is recorded in the recording layer and a second different place where a second piece of information is recorded is twice the distance (reference amount of change) between the first place and a place where the intensity of diffracted light from the first piece of information exhibits a First Null, when the optical density αL is in a range from 0.3 to 1.1.

In the holographic recording method, a relative distance between a first place where a first piece of information is recorded in the recording layer and a second different place where a second piece of information is recorded is three times the distance (reference amount of change) between the first place and a place where the intensity of diffracted light from the first piece of information exhibits a First Null, when the optical density αL is in a range more than 1.1 and not more than 2.0.

In the holographic recording method, the recording is performed by simultaneously applying signal light and reference light at an angle different from that of the signal light to the recording layer, wherein the reference light passes through a lens to form a spherical wave (a spherical reference wave) with respect to the recording layer, and wherein when the spherical reference wave is applied each time the holographic recording medium is shifted by a constant distance in its surface direction for the purpose of shift-multiplexed storage, the constant distance δ (shift space) by which the holographic recording medium is shifted satisfies Formula (2):

$$\delta \geq n \cdot \lambda z_o / (L \cdot \sin\theta) \tag{2}$$

wherein δ represents the shift space (μm), n represents an integer of 2 or more, λ represents the wavelength (μm) of the signal light and the spherical reference wave applied at the time of recording, θ represents an angle (deg) which the signal light forms with the center optical axis of the spherical reference wave, and $z_o$ represents the distance (μm) between the recording layer and the lens for forming the spherical wave.

In the holographic recording method, the value of n in Formula (2) is 2 when the optical density αL is in a range from 0.3 to 1.1.

In the holographic recording method, the value of n in Formula (2) is 3 when the optical density αL is in a range from more than 1.1 to not more than 2.0.

In the holographic recording method of the invention, recording or reproduction is performed by applying light to the holographic recording medium of the invention (signal and reference beams are applied to the recording layer when recording, and a reference beam is applied during reproduction). The holographic recording method of the invention uses the holographic recording medium of the invention which has a high diffraction efficiency and therefore high reproduction output can be obtained during reproduction.

Referring to the drawings, the principle of the holographic recording method is described below. FIG. 1 is a schematic diagram showing an optical system for illustrating the principle of recording and reproduction with a holographic recording medium. Specifically, it shows an example of a basic optical system for recording/reproducing information through a holographic recording medium. In FIG. 1, reference numeral 10 represents a coherent beam, 11 a signal beam, 12 a reference beam, 13 a diffracted beam, 20 a light source, 21 a beam splitter, 22 a mirror, 23 a rotating stage, 24 a detector (a power meter), 25 a first shutter, 26 a second shutter, and 30 a holographic recording medium.

In the optical system as shown in FIG. 1, for example, the coherent beam 10 is a laser beam with a wavelength of 532 nm emitted from the light source 20. The coherent beam 10 enters the beam splitter 21 to be divided into the signal beam 11 continuing to proceed straight ahead and the reference beam 12 proceeding in a direction substantially perpendicular to the coherent beam 10. The first shutter 25 is provided between the light source 20 and the beam splitter 21 in order to block the coherent beam 10 from entering the beam splitter 21, as needed. In FIG. 1, the first shutter 25 is in an open state (to allow the coherent beam 10 to enter the beam splitter 21).

The holographic recording medium 30 is rotatably provided on the rotating stage 23 in the path of the signal beam 11 such that adjustments can be made to the incident angle of the signal beam 11 entering the holographic recording medium 30 and to the incident angle of the reference beam 12 reflected from the mirror 22 and entering the holographic recording medium 30. The second shutter 26 is provided between the beam splitter 21 and the holographic recording medium 30 so as to block the signal beam 11 from entering the holographic recording medium 30. In FIG. 1, the second shutter 26 is in an open state (to allow the signal beam 11 to enter the holographic recording medium 30).

When information is recorded in this system, the shutter 26 is opened and the signal beam 11 and the reference beam 12 are applied simultaneously to the holographic recording medium 30. When information is reproduced, the second shutter 26 is closed and only the reference beam 12 is applied to the holographic recording medium 30. In which case, the reference beam 12 enters the holographic recording medium 30 and is diffracted to form the diffracted beam 13 (a primary diffracted beam) along the path of the signal beam 11 (on the side of the holographic recording medium 30 opposite to the side where the beam splitter 21 is provided). The diffracted beam 13 is detected as a reproduction signal by the detector 24, such as a power meter, provided in the path of the signal beam 11 on the side of the holographic recording medium 30 opposite to the side where the beam splitter 21 is provided.

In such an optical system, the diffraction efficiency η of the holographic recording medium 30 is expressed as the ratio of the intensity P of the diffracted beam 13 to the intensity $P_o$ of the reference beam 12 ($\eta = P/P_o$). The intensity of the reference beam 12 or the diffracted beam 13 in this instance may be measured using an optical power meter.

Figure 2:
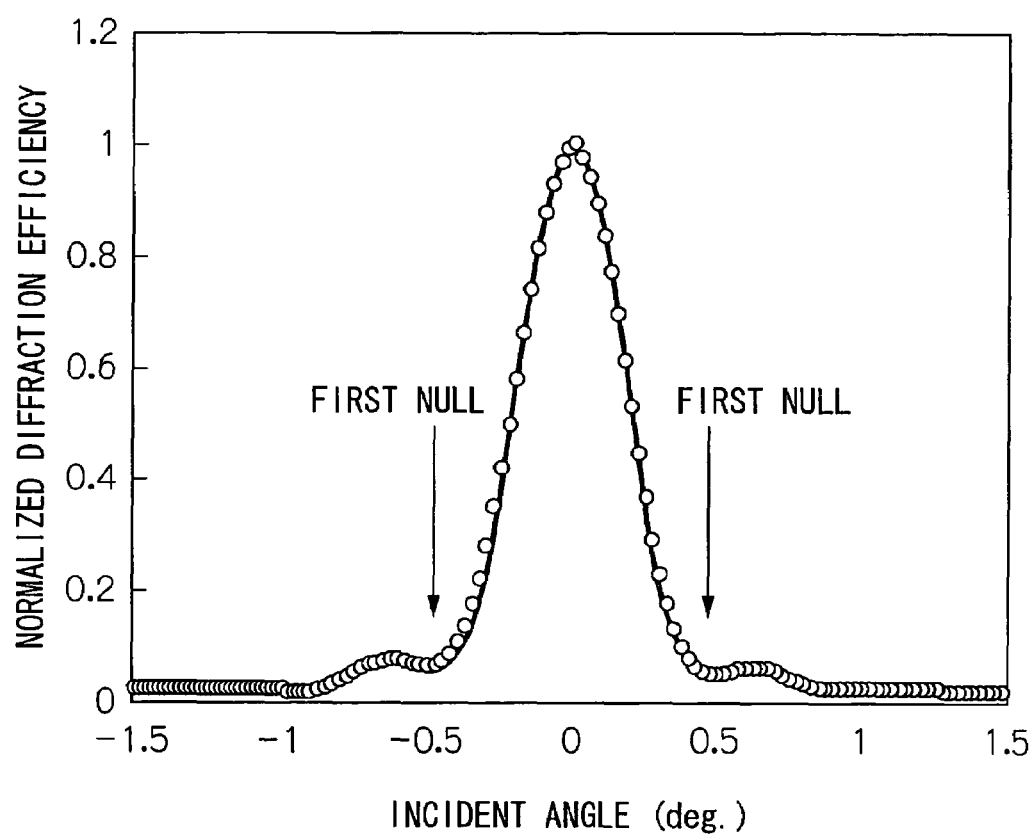
FIG. 2 is a graph showing an example of the change in diffraction efficiency in a case where while reference light is applied to a holographic recording medium having recorded information, the incident angle of the reference light with respect to the medium is changed.

The Bragg condition can be determined using the optical system as shown in FIG. 1. FIG. 2 is a graph showing an example of the change in diffraction efficiency when the incident angle of the reference beam with respect to the holographic recording medium is changed while the reference beam is applied to a holographic recording medium having recorded information, wherein the horizontal axis represents the incident angle (deg) of the reference beam, specifically, it represents relative deviations from a reference angle (0 deg), the reference angle being the incident angle of the reference beam at the time of information recording. (It should be noted that in FIG. 2, 0 deg is not the actual incident angle of the reference beam with respect to the recording layer but is a representation for easy understanding of the relative relationship between different incident angles of the reference beam.)

The vertical axis represents normalized diffraction efficiency which is normalized such that the diffraction efficiency is 1 when the incident angle is 0 deg.

FIG. 2 indicates that angle dependency (angle selectivity) exists in which the diffraction efficiency decreases as the reference beam deviates from the incident angle at the time of information recording (0 deg in FIG. 2). When the absorption of the reference beam incident on the holographic recording medium is negligible, the angle dependency (selectivity) is proportional to the sinc function. Herein, the condition (angle) under which the diffraction efficiency is substantially zero for the first time is referred to as a First Null. In the example of FIG. 2, First Nulls exist at ±0.5 deg.

The angle at which a First Null is produced, specifically, the deviation width $\Delta\theta1$ from the incident angle of the reference beam at the time of information recording (0 deg in FIG. 2), is expressed by Formula (4):

$$\Delta\theta1=\lambda/(L\cdot\sin\theta) \qquad (4)$$

wherein $\Delta\theta1$ represents the angle (deg) at which a First Null is produced, $\lambda$ represents the wavelength ($\mu$m) of the signal and reference beams applied at the time of recording, L represents the thickness ($\mu$m) of the recording layer, and $\theta$ represents the angle (deg) between the signal and reference beams applied to the recording layer at the time of information recording.

In angle-multiplexed storage in which the incident angle of the reference beam on the recording layer is changed while information is recorded on the holographic recording medium, if the diffraction efficiency is substantially 0 at $\Delta\theta1$ with respect to information recorded at the reference angle (0 deg in FIG. 2), crosstalk can be prevented between a piece of information recorded at the reference angle and another piece of information recorded at an angle deviating by $\Delta\theta1$ from the reference angle. When the diffraction efficiency is substantially 0 at $\Delta\theta1$, however, the maximum diffraction efficiency itself is low, being less than 0.1, so that multiplexed recording itself can be difficult.

In which case, it is preferred that information recording be performed with an angular space $\Delta\theta$ that is at least n times the value of $\Delta\theta1$, where n is an integer of 2 or more. Thus, even if the maximum diffraction efficiency is more than 0.1 at the reference angle, crosstalk can be suppressed since the angle deviates sufficiently from the reference angle.

A large $\Delta\theta$ is preferred for the purpose of suppressing or preventing crosstalk, and $\Delta\theta$ is preferably at least three times the value of $\Delta\theta1$. If $\Delta\theta$ is too large, however, effective multiplicity may be too low for sufficient recording density to be achieved. Therefore, $\Delta\theta$ is preferably at most five times the value of $\Delta\theta1$.

The crosstalk may be quantitatively evaluated with an SN ratio. Bit error rate (BER) decreases as the SN ratio increases. A lower bit error rate means a lower incidence of crosstalk.

It is also important that information recording on the holographic recording medium can be performed at high density and with a low bit error rate (crosstalk) as described above.

In order to achieve both high recording density and a low bit error rate at the same time, it is preferred that the angular space $\Delta\theta$ be twice the value of $\Delta\theta1$ (Second Null) when that the optical density $\alpha L$ is in a range from 0.3 to 1.1, and that the angular space $\Delta\theta$ be three times the value of $\Delta\theta1$ (Third Null) when the optical density $\alpha L$ is more than 1.1 and not more than 2.0.

When the above conditions are not satisfied, there are cases where the recording density is reduced, or the bit error rate is increased, such that a high recording density and a low bit error rate cannot be achieved simultaneously.

The thickness L suitable for the above conditions is preferably from 100 $\mu$m to 2 mm, and the multiplicity may be any value of 2 or more.

Besides the above-described angle-multiplexed storage method, the multiplexed recording method may be a shift-multiplexed storage method, in which the angle between the signal and reference beams is not changed while the holographic recording medium is relatively shifted so that different pieces of information can be multiplexed and recorded in substantially the same volume (region) of the recording layer. For example, using a spherical reference wave as the reference beam in this method, a slight shift of the holographic recording medium corresponds to a change in the incident angle of the reference beam. Therefore, the above description of the angle-multiplexed storage method may be applied to shift-multiplexed storage.

Figure 3:
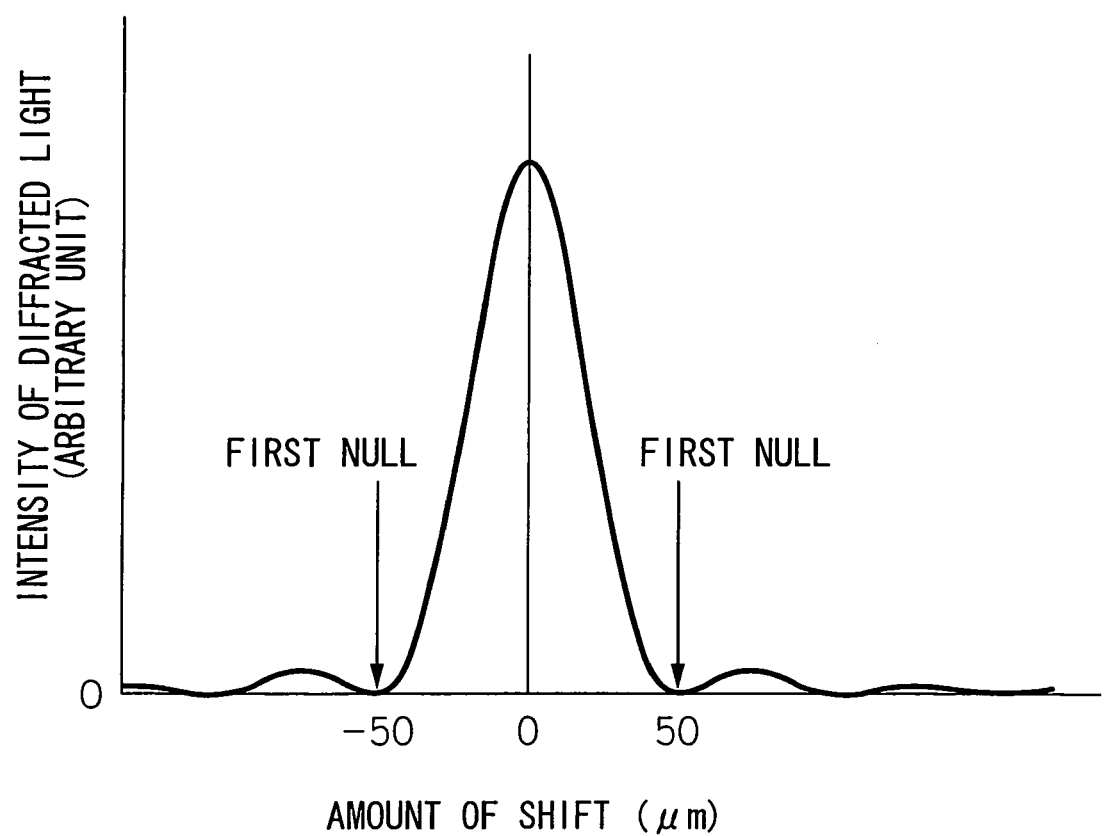
FIG. 3 is a graph showing an example of the change in diffracted light intensity in a case where while a spherical reference wave is applied to a holographic recording medium having recorded information, the medium is shifted in its surface direction.

FIG. 3 is a graph showing an example of the change in the intensity of a diffracted beam when a holographic recording medium having recorded information is shifted in its surface direction while a reference beam (a spherical reference wave) which passes through a lens so as to form a spherical wave is applied to the medium, wherein the horizontal axis represents the movement distance of the holographic recording medium (the amount of the shift), and the vertical axis represents the intensity of the diffracted beam. In shift-multiplexed storage, the selectivity of the diffracted beam intensity for the amount of the shift is proportional to the sinc function, similarly to the angle selectivity as shown in FIG. 2. In the example of FIG. 3, First Nulls are produced at shift amounts of ±50 $\mu$m. In this shift-multiplexed storage, First Null is given according to Formula (5):

$$\delta1=\lambda z_o/(L\cdot\sin\theta) \qquad (5)$$

wherein $\delta1$ represents the shift amount ($\mu$m) at which a First Null is produced, $\lambda$ represents the wavelength ($\mu$m) of the signal beam and the spherical reference wave applied at the time of recording, $\theta$ represents an angle (deg) which the signal beam forms with the center optical axis of the spherical reference wave, and $z_o$ represents the distance ($\mu$m) between the recording layer and the lens for forming the spherical wave.

In this case as well, a shift space $\delta$ between recordings of a first piece of information and a second piece of information is defined as a value n times the shift amount $\delta1$ at which a First Null is produced, where n is preferably at least 2, more preferably at least 3, and preferably at most 5. This case is similar to the previously discussed angle-multiplexed storage, although there is a difference between the angle spacing and the shift amount.

Angle-multiplexed storage and shift-multiplexed storage differ as to whether the space used in information recording is an angle or an amount of shift, but are similar that multiplexed recording is performed using a point which is an integer multiplied by a point where the diffraction efficiency is substantially zero (First Null). Therefore, it is thought that the conditions for simultaneously achieving both high recording density and a low bit error rate in shift-multiplexed storage are similar to those for angle-multiplexed storage.

That is, for both high recording density and a low bit error rate to be achieved simultaneously in shift-multiplexed storage, it is preferable that the shift space δ be twice the shift amount δ1 (Second Null) when the optical density αL is in a range from 0.3 to 1.1, and that the shift space δ be three times the shift amount δ1 (Third Null) when the optical density αL is in a range from more than 1.1 to not more than 2.0.

When the above conditions are not satisfied, there are instances where the recording density is reduced, or the bit error rate is increased, such that a high recording density and a low bit error rate cannot be achieved simultaneously.

The thickness L suitable for the above conditions is preferably in a range from 100 μm to 2 mm, and the multiplicity may be any value of 2 or more.

For more information on shift-multiplexed storage, for example, G. Barbastathis, M. Levene and D. Psaltis, Appl. Opt. 35, 2403 (1996) can be referred to.

The apparatus for use in the holographic recording method of the invention is described in detail with reference to the example below.

Figure 4:
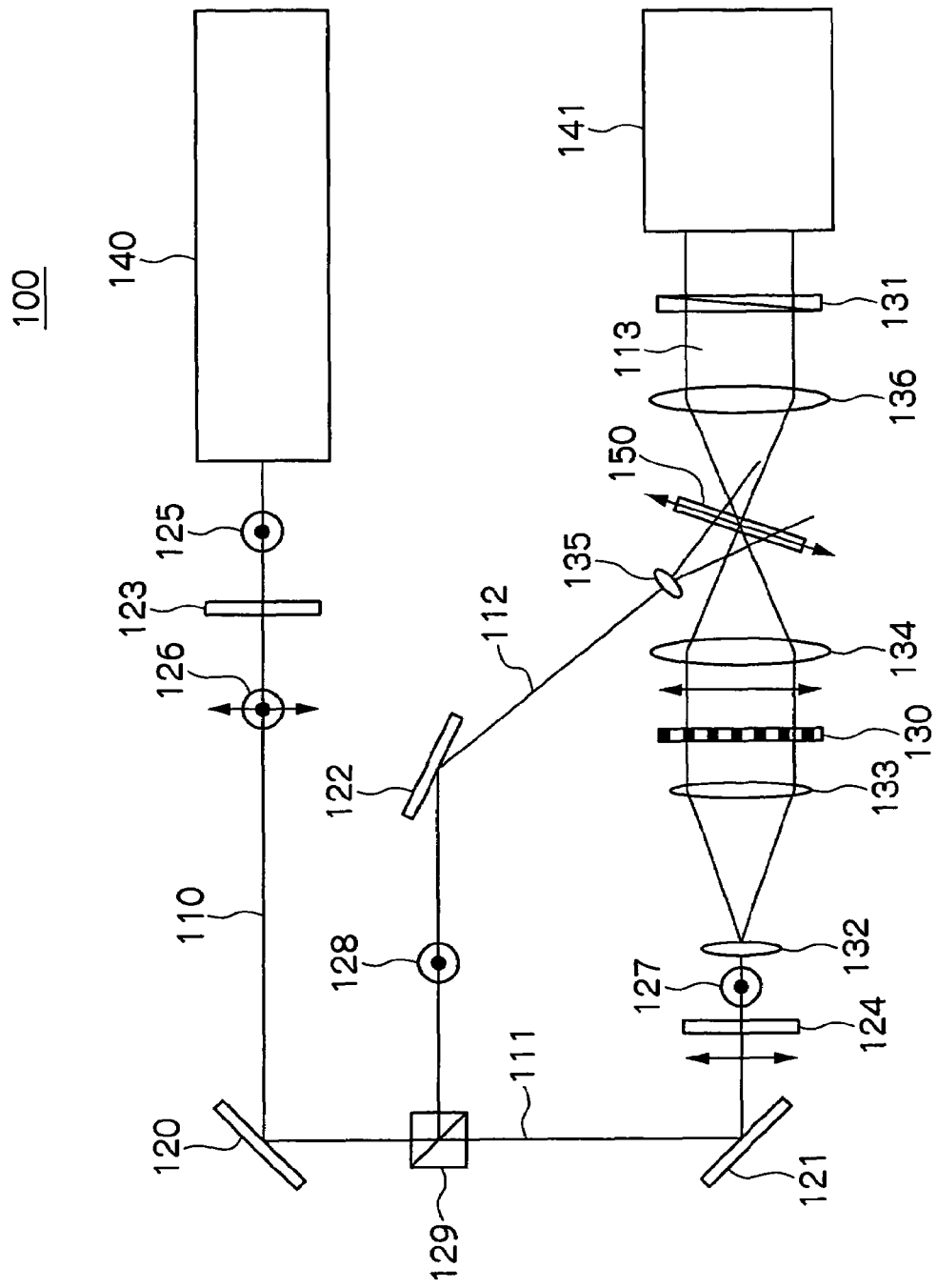
FIG. 4 is a schematic diagram showing an example of a configuration of an apparatus (a digital holographic storage system) for use in the holographic recording method of the invention.

FIG. 4 is a schematic diagram showing an example of configuration of the apparatus (a digital holographic storage system) for use in the holographic recording method of the invention. In FIG. 4, reference numeral 100 represents the digital holographic storage system, 110 a laser beam, 111 a signal beam, 112 a reference beam, 113 a reproduction beam (a diffracted beam), 120, 121 and 122 mirrors, 123 and 124 λ/2-phase plates, 125, 126, 127, and 128 linearly polarized states of light, 129 a beam splitter, 130 a spatial light modulator (a liquid crystal panel manufactured by Sony Corporation, 1024×768 pixels, 14 mm square), 131 an analyzer, 132 and 133 lenses, 134 a lens (with a focal length of 50 mm), 135 a lens (N.A.=0.5), 136 a lens (with a focal length of 50 mm), 140 a laser light source (wavelength: 532 nm, power: 100 mW, diode-pumped Nd:YVO$_4$ laser), 141 a CCD (manufactured by Dalsa Corporation, 1024×1024 pixels, 14 mm square), and 150 a holographic recording medium (a transmission type holographic recording medium comprising two glass substrates and a recording layer which is provided between the glass substrates, the recording layer comprising an azo polyester as a photorefractive material).

The digital holographic storage system 100 shown in FIG. 4 is the same in principle as the optical system shown in FIG. 1, and has optical members and devices such as various lenses and a spatial modulator provided in the optical path, based on the optical system as shown in FIG. 1. In the system 100, shift-multiplexed storage is possible using, for example, a spherical reference wave or a speckle reference wave. The digital holographic storage system 100 is briefly described below.

The laser beam 110 emitted from the laser light source 140 enters the beam splitter 129 via a mirror 120 and is divided into the signal beam 111 and the reference beam 112.

The signal beam 111 is reflected by the mirror 121 and passes through the lens 132 and becomes a diffuse beam. The diffuse beam passes through the lens 133 and is converted into a collimated beam, which then passes through the spatial modulator 130 where it is modulated. The signal beam 111 is then concentrated by the lens 134 and applied to the holographic recording medium 150 mounted on a sample stage (not shown) such that the focal point is placed on the recording layer of the holographic recording medium 150.

The reference beam 112 is reflected by the mirror 122, after which it is converted into a diffuse beam (a spherical wave) by the lens 135, and then applied to the surface of the holographic recording medium 150 on which the signal beam 111 is applied.

In this manner, the signal beam 111 and the reference beam 112 enter the holographic recording medium 150 whereby information is recorded. The holographic recording medium 150 mounted on the sample stage (not shown) is movable in its surface direction. Therefore, if an amount of movement (the shift space δ) in the surface direction is selected so as to have a value as previously described, crosstalk can be suppressed to a negligible level for multiplexed recording. When the holographic recording medium is shifted at the time of reproduction, a result as shown in FIG. 3 can be obtained.

When the reference beam 112 is applied to the holographic recording medium 150, the reproduction beam 113 is formed along the path of the signal beam 111 and travels from the surface of the holographic recording medium 150 on the side opposite to the side where the signal beam 111 enters. The reproduction beam 113 is a diffuse beam and thus is converted into a collimated beam by the lens 136 and then detected by the CCD 141. The lenses 134 and 136 are pre-adjusted such that each pixel of the CCD 141 matches each pixel of the spatial light modulator 130.

Figure 5:
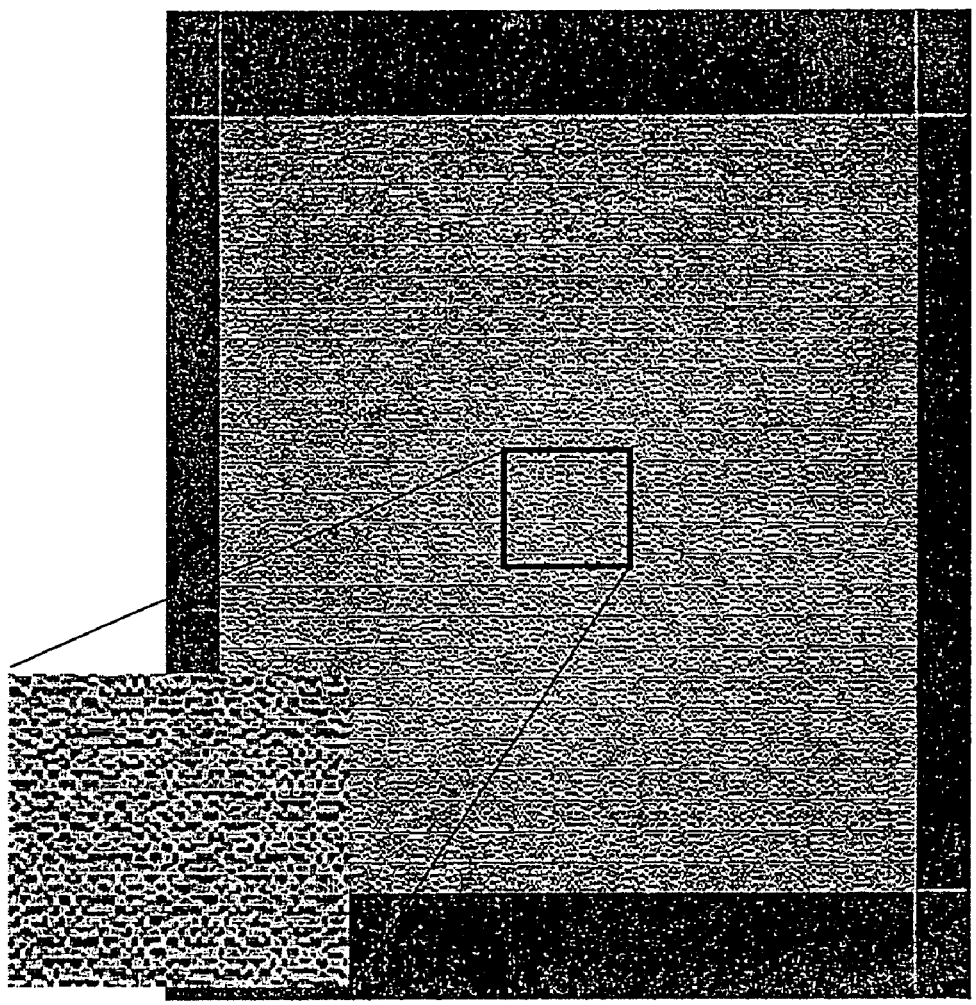
FIG. 5 is a diffraction image (a reproduced image) obtained by a process including the steps of reproducing recorded information from a holographic recording medium 150 with a digital holographic storage system 100 as shown in FIG. 4 and detecting the information by a CCD 141.

FIG. 5 shows an example of the diffraction image (reproducted image) which is produced when the information recorded on the holographic recording medium 150 is reproduced using the digital holographic storage system 100 of FIG. 4 and detected by the CCD 141. A part of the diffraction image is magnified and shown at lower left in FIG. 5. When the information on the diffraction image is holographically recorded, a data page is input into the spatial light modulator 130 and modulated into the signal beam 111, which is applied simultaneously with the reference beam 135 to the holographic recording medium 150.

EXAMPLES

The invention is further described by means of the examples below, which are not intended to limit the scope of the invention.

Methods and Apparatuses for Evaluation

The methods as described below are used for the measurement and evaluation of: the bit error rate and optical density of the holographic recording media prepared in the examples and the comparative examples below; and the absorption coefficient of the photorefractive material used in the production of the holographic recording media.

Measurement of Bit Error

Concerning the presence or absence of crosstalk in the multiplexed recording on the holographic recording medium, a change in bit error against a change in the optical density of the holographic recording medium is measured using the digital data storage system 100 as shown in FIG. 4.

The measurement of the bit error rate is performed using a recording method based on the differential coding method as shown in FIG. 6. In the differential coding method of FIG. 6, vertical two pixels×lateral four pixels form one bit. In this method, the combination of four bright pixels on the left side and four dark pixels on the right side represents "1" as shown at left in FIG. 6, and the combination of four dark pixels on the left side and four bright pixels on the right side represents "0" as shown at right in FIG. 6 (see J. F. Heanue, M. C. Bashaw and L. Hesselink, Science, 265, 749 (1994) for more information).

Information to be recorded on the holographic recording medium is prepared, which is 20 pages of digital data encoded as shown in FIG. 5 by the differential coding method. Shift-multiplexed recording of the digital data pages is performed using a spherical reference wave in the digital data storage system 100 as shown in FIG. 4. After the recording, all the digital data pages are reproduced by the application of a reference beam (a spherical reference wave) to the holographic recording medium. In this process, "1" and "0" are read from the reproduced data and compared with the input data so that a bit error rate (BER) can be obtained. Based on the evaluation of the BER, an evaluation can be performed on the presence or absence of crosstalk at the time of multiplexed recording.

Measurement of Optical Density and Absorption Coefficient

The methods as described above are used in the measurement of: the optical density or absorption coefficient of the holographic recording medium; and the absorption coefficient of the photorefractive material itself used in the recording layer.

Example 1/Comparative Example 1

Preparation of Holographic Recording Media

Different holographic recording media being different in absorption coefficient and being the same in the thickness of the recording layer are prepared as described below.

The polyester represented by Structural Formula (2) below which has an azobenzene structure in its side chain and has a weight average molecular weight (Mw) of 20000 (hereinafter sometimes abbreviated as "Azopolymer (1)") is used as a photorefractive material. The polyester represented by Structural Formula (1) which has cyanobiphenyl in its side chain and has a weight average molecular weight of 20000 (hereinafter sometimes abbreviated as "the binder") is used as a binder material. A holographic recording medium is prepared using

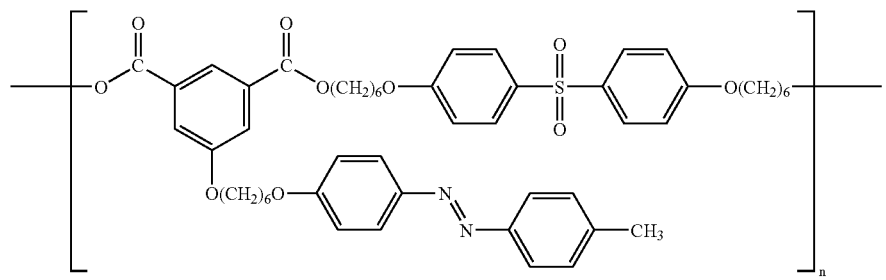

Azopolymer (1) alone or using both Azopolymer (1) and the binder.

In the process of preparing the holographic recording medium, the weight ratio of Azopolymer (1) is set at 10, 30, 50, 70, or 100% by weight, and a holographic recording medium consisting of a 250 µm thick recording layer is prepared by the above hot press method.

Using the above measurement method, the optical densities αL of the resulting holographic recording media are determined as 0.2, 0.6, 1.2, 1.6, and 2.2, respectively, in order of increasing Azopolymer weight ratio. Thus, the absorption coefficients of these media are 8, 24, 47, 62, and 89 $cm^{-1}$, respectively. These optical densities and absorption coefficients are with respect to a wavelength of 532 nm. The absorption coefficient α' of Azopolymer (1) alone is 89 $cm^{-1}$ which corresponds to that of the recording layer in the case that the weight ratio of Azopolymer (1) is 100% by weight.

Measurement of Diffraction Efficiency

The diffraction efficiency of each holographic recording medium is determined using the optical system as shown in FIG. 1, in which the light source is a laser with a wavelength of 532 nm. The signal and reference beams are applied at the same time, and then only the reference beam is applied when the intensity of the diffracted beam is measured. When the exposure energy is about 30 $J/cm^2$ at the time of recording, each recording medium exhibits a substantially maximum diffraction efficiency. As described above, the diffraction efficiency is the ratio of the intensity of the diffracted beam to the intensity of the reference beam incident on the holographic recording medium.

Figure 7:
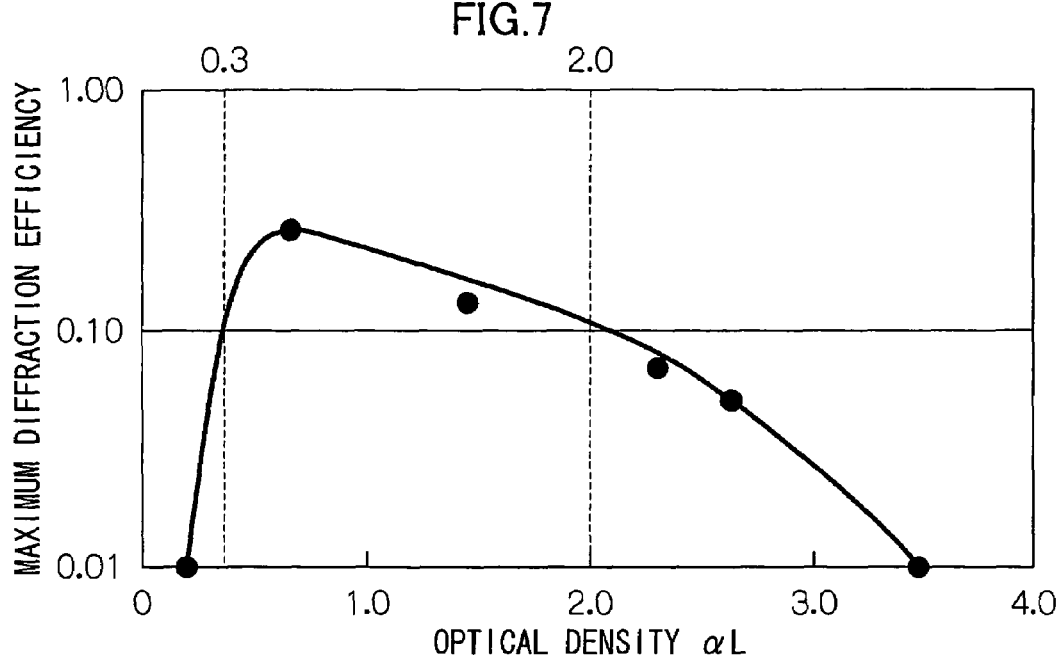
FIG. 7 is a graph showing changes in diffraction efficiency against the optical densities αL of the holographic recording media of Example 1/Comparative Example 1.

FIG. 7 shows the result of plotting the diffraction efficiency (the maximum value) of each holographic recording medium on the vertical axis and plotting organic densities αL on the lateral axis. FIG. 7 indicates that a diffraction efficiency of at least 0.1 is obtained in the optical density αL range from 0.3 to 2.0. In this range, therefore, at least 100 multiplexed recording is possible.

Evaluation of Bragg Condition (Shift Selectivity)

Figure 8:
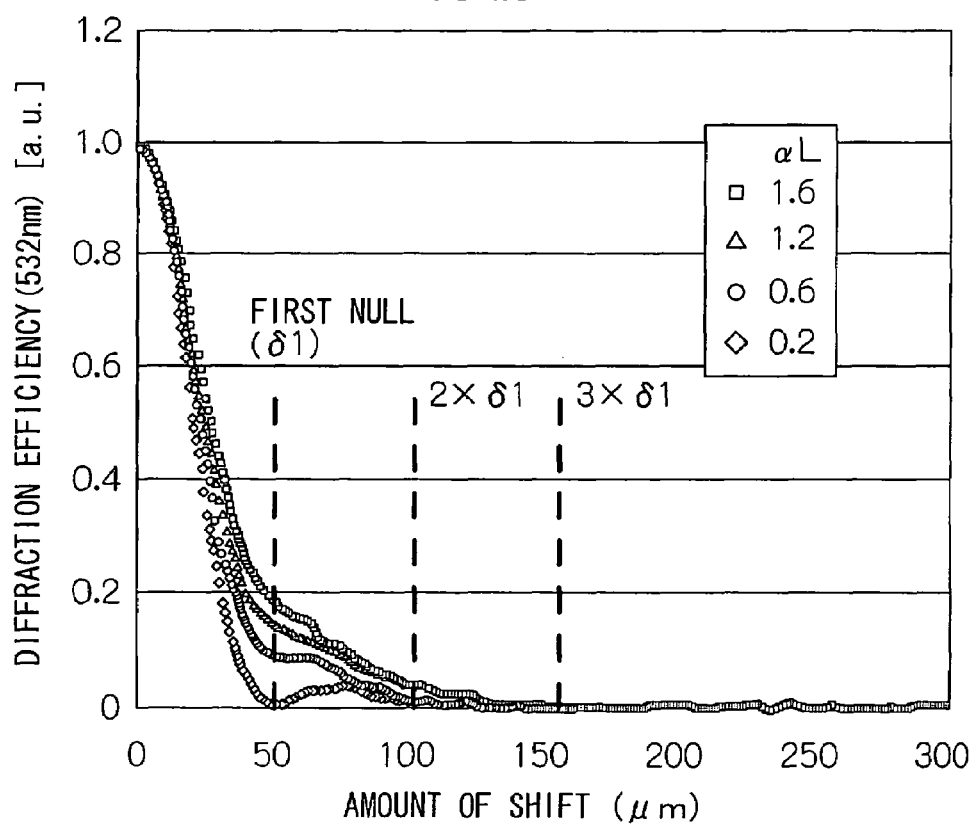
FIG. 8 is a graph showing changes in diffraction efficiency against the amounts of shift of the holographic recording media of Example 1/Comparative Example 1.

The Bragg condition for the information recorded on each holographic recording medium is determined. The Bragg condition is determined from variations in the diffraction efficiency against the shift amounts as shown in FIG. 8, wherein the diffraction efficiency is measured with respect to the holographic recording medium being shifted in its surface direction, while the reference beam is applied to the holographic recording medium. In FIG. 8, the lateral axis represents the relative shift amount of the holographic recording medium in the case that the position of the holographic recording medium at the time of information recording is used as the reference (0 µm), and the vertical axis represents the diffraction efficiency. In FIG. 8, the plotted lines indicated by the figures □, Δ, ○, and ◇, respectively, are the results of measuring the diffraction efficiencies with respect to the holographic recording media having optical densities αL of 1.6, 1.2, 0.6, and 0.2, respectively.

FIG. 8 indicates that in the holographic recording medium with an optical density αL of as small as 0.2, the diffraction efficiency is reduced to about zero at a shift amount of 50 µm, and the so-called First Null exists. The diffraction efficiency at this shift position (First Null) increases with the optical density. The cause of this may be that the medium with the higher optical density can more block the recording light from penetrating in its depth direction so that information can insufficiently be recorded. In the case of high-density multiplexed recording of information, another piece of information may be recorded at First Null. Such a case can cause a problem that crosstalk occurs between pieces of information recorded by multiplexed recording on a high optical density medium. The crosstalk can cause bit errors in the case of digital data storage.

Measurement of Bit Error Rate (BER)

FIG. 9 shows the result of evaluating BER with respect to each of the holographic recording media different in optical density. FIG. 9 shows the result of determining the relative bit error rate against the shift amount with respect to each of the holographic recording media having optical densities of 1.6, 1.2 and 0.6, respectively, wherein the lateral axis represents the shift amount, and the vertical axis represents the relative bit error rate. Concerning the vertical axis, a BER produced by 20 multiplexed recording with a shift amount of 250 µm is used as a reference value of 1. In FIG. 9, the plotted lines indicated by the figures □, Δ and ○, respectively, are the results of measuring BER with respect to the holographic recording media having optical densities $\alpha L$ of 1.6, 1.2 and 0.6, respectively.

FIG. 9 indicates that at a shift amount of 50 µm (or the shift amount δ1 where First Null is produced), the BER decreases with the optical density, and the BER of the holographic recording medium with an optical density of 0.6 is at a negligible level.

The holographic recording medium with an optical density $\alpha L$ of 1.6 or 1.2, which can have high diffraction efficiency, can cause a problem of many errors at a shift amount of 50 µm. This should be caused by crosstalk between pieces of information stored by multiplexed recording. At a shift amount of 100 µm (2×δ1), the BER is reduced to a certain level which can substantially compare with the level in the case of the holographic recording medium with an optical density of 0.6 at a shift amount of 50 µm, and this should mean that no error can occur in practical use. It is also apparent that the BER is further reduced at a shift amount of 150 µm (3×δ1).

Example 2/Comparative Example 2

Preparation of Holographic Recording Media

Different holographic recording media being different in the thickness of the recording layer and being the same in the absorption coefficient of the recording layer material are prepared as described below.

A coating liquid of a tetrahydrofuran solution of the polyester (photorefractive material) represented by Structural Formula (2) with an azobenzene structure in its side chain and with a weight average molecular weight (Mw) of 20000 (hereinafter sometimes abbreviated as "Azopolymer (2)") is applied to a concentrically-shaped polycarbonate substrate (1.1 mm in thickness, 20 mm in inner diameter, 65 mm in outer diameter) by a spin coating method and dried to from a recording layer, so that a holographic recording medium is prepared.

The recording layer is formed with a thickness varying from 1 µm to 70 µm. Thus, different holographic recording media are produced each with a different optical density $\alpha L$ in the range from 0.1 to 2.8.

Using a holographic recording medium with a known thickness, the absorption coefficient of the recording layer consisting of the photorefractive material, Azopolymer (2), alone is determined as 400 cm$^{-1}$.

Measurement of Diffraction Efficiency

Each holographic recording medium with a film thickness varying from 1 µm to 70 µm is measured for diffraction efficiency in the optical system as shown in FIG. 1 similarly to Example 1/Comparative Example 1. FIG. 10 shows the result of plotting the diffraction efficiency (the maximum value) of each holographic recording medium on the vertical axis and plotting the optical density $\alpha L$ on the lateral axis. FIG. 10 indicates that a diffraction efficiency of at least 0.1 is obtained in the optical density $\alpha L$ range from 0.3 to 2.0. In this range, therefore, at least 100 multiplexed recording is possible. The diffraction efficiency has a maximum value (0.25) at an optical density $\alpha L$ of 1.0.

Example 3/Comparative Example 3

Preparation of Holographic Recording Media

Different optical recording media being different in the absorption coefficient of the recording layer material and being the same in the thickness of the recording layer are prepared as described below.

A solution of appropriate amounts of a xanthene dye, uranine (photorefractive material) as shown in Isomerization Example 4 and polyvinyl alcohol (PVA) (binder material) in dimethyl sulfoxide (DMSO) (solvent) is cast on a glass substrate, and then the solvent is evaporated so that a recording layer is formed with a thickness of 250 µm. Different recording layers are formed using solutions different in the mixing ratio of uranine and PVA so that holographic recording media are produced each with an optical density $\alpha L$ of from 0.1 to 3.6. The molar absorption coefficient of uranine itself is $9 \times 10^3$ (m$^2$/mol) at the maximum absorption wavelength (493 nm).

Various Evaluations

Figure 11:
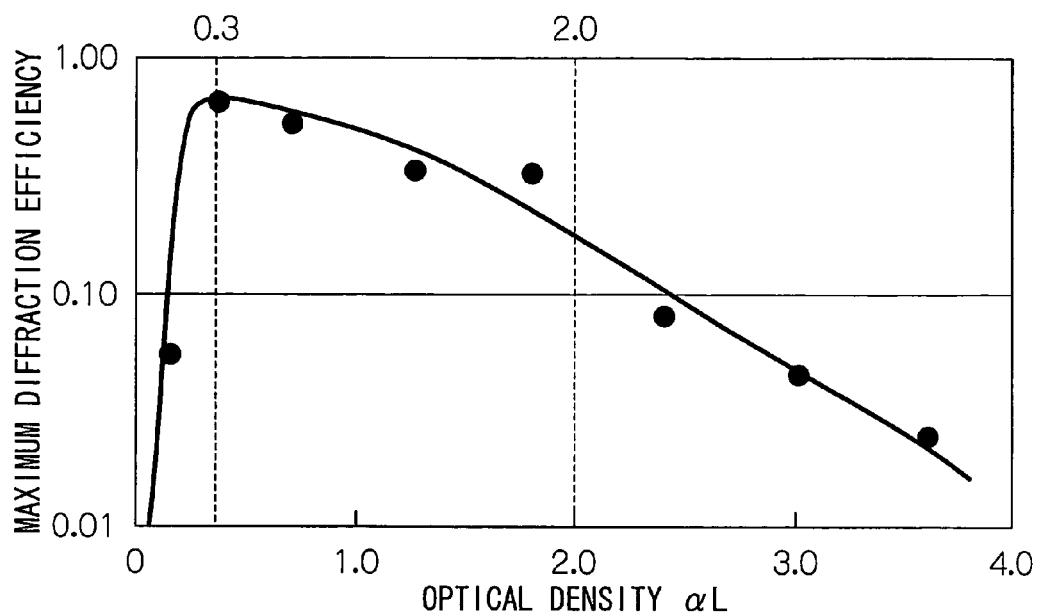
FIG. 11 is a graph showing changes in diffraction efficiency against the optical densities αL of the holographic recording media of Example 3/Comparative Example 3.

The diffraction efficiency is then measured using the optical system as shown in FIG. 1 similarly to Example 1/Comparative Example 1. When the exposure energy is about 10 J/cm$^2$ at the time of recording, each recording medium exhibits a substantially maximum diffraction efficiency. FIG. 11 shows the result of plotting the diffraction efficiency (maximum value) of each holographic recording medium on the vertical axis and plotting the optical density $\alpha L$ on the lateral axis. FIG. 11 indicates that a diffraction efficiency of at least 0.1 is obtained in the optical density $\alpha L$ range from 0.3 to 2.0. In this range, therefore, at least 100 multiplexed recording is possible.

The Bragg condition is determined similarly to Example 1/Comparative Example 1, and the result is substantially the same as Example 1/Comparative Example 1 (substantially the same as FIG. 8). The BER is also measured similarly to Example 1/Comparative Example 1, and the result has substantially the same tendency as Example 1/Comparative Example 1 (substantially the same tendency as FIG. 9). At a shift amount of 2×δ1, the BER is reduced to a practically negligible level, and at a shift amount of 3×δ1, the BER is further reduced to a level where almost no error occurs.

The results of Examples/Comparative Examples as described above show that as long as the optical density $\alpha L$ of the holographic recording medium is at least in the range from 0.3 to 2.0, the diffraction efficiency will be at such a level that a practically sufficient reproduction output can be produced regardless of the absorption coefficient of the photorefractive material used for the recording layer. It is also apparent that if shift-multiplexed recording is performed with a shift amount at least twice the shift amount for First Null, the bit error rate can be at a practically negligible level.

Figure 12:
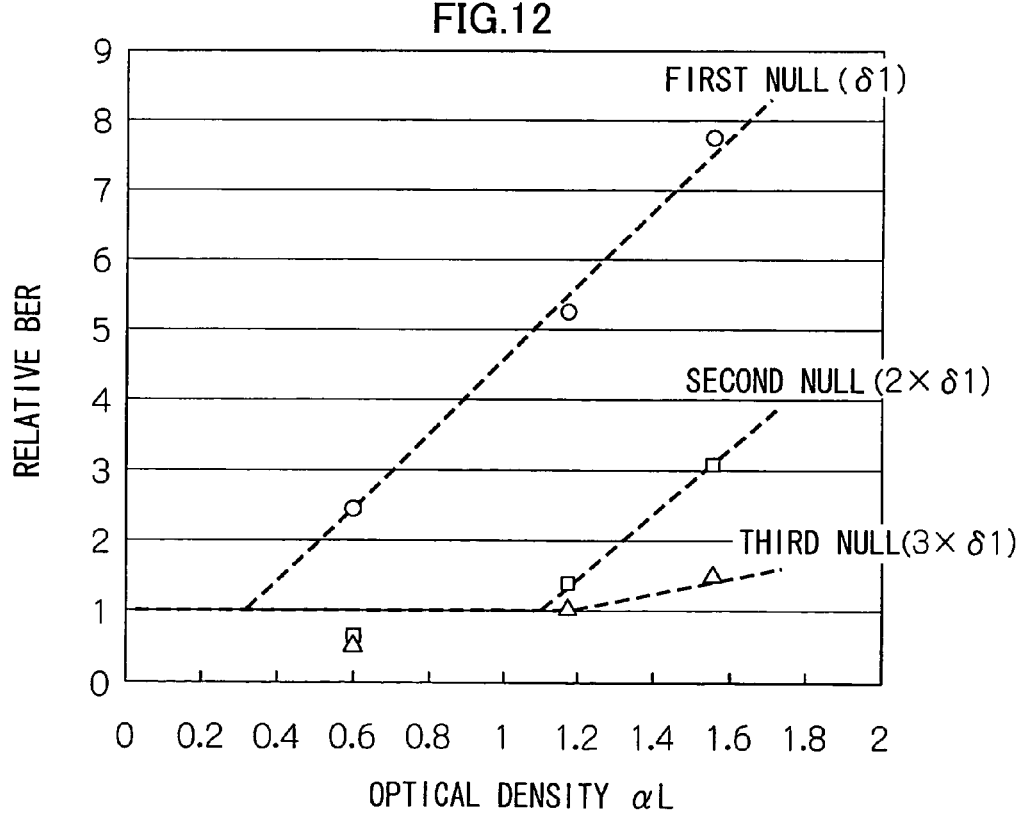
FIG. 12 is a graph showing changes in bit error rate against the optical densities αL of the holographic recording media of Example 1.

The relative bit error rates (as shown in FIG. 9) of the holographic recording media of Example 1 (optical density αL=0.6, 1.2, 1.6) are arranged against the optical density αL, and the result is shown. FIG. 12 is a graph showing variations in the relative bit error rate against the optical densities αL of the holographic recording media of Example 1. In the drawing, the figure ○ indicates variations in the relative bit error rate against the optical densities αL at First Null; the figure □ indicates those at Second Null; and the figure Δ indicates those at Third Null.

FIG. 12 shows that if the optical density αL is in the range from 0.3 to 2.0 which can ensure a diffraction efficiency of at least 0.1 for high-density multiplexed recording, the recording at First Null can have a high relative bit error rate. However, if the recording is performed at Second Null (2×δ1) in the optical density αL range from 0.3 to 1.1 or performed at Third Null (3×δ1) in the optical density αL range of more than 1.1 to 2.0, the relative bit error rate can be suppressed to the lowest level.

It is therefore apparent that if the recording is performed at Second Null (2×δ1) in the optical density αL range from 0.3 to 1.1 or performed at Third Null (3×δ1) in the optical density αL range of more than 1.1 to 2.0, both high density recording and low bit error rate can be achieved at the same time.

The above description is provided to show the multiplexed recording method depending on the optical density of the holographic recording medium with reference to the examples of the angle-multiplexed recording method and the shift-multiplexed recording method using a spherical reference wave. However, the description is not limitedly applied to the two types of multiplexed recording methods but can be applied to any multiplexed recording method using the Bragg condition. In the range from 0.3 to 2.0 of the optical density αL of the holographic recording medium, therefore, if the recording is performed at Second Null (2×δ1) with a holographic recording medium having an optical density αL of from 0.3 to 1.1 or performed at Third Null (3×δ1) with a holographic recording medium having an optical density αL of more than 1.1 to 2.0, both high density recording and low bit error rate can be achieved at a high level.

Examples of the multiplexed recording method using the Bragg condition (angle selectivity, wavelength selectivity) includes the following methods: (1) a method (angle-multiplexed recording method) comprising the step of applying signal light with a first incident angle and reference light with a second incident angle different from the first incident angle to a recording layer at the same time, wherein the multiplexed recording is performed by keeping constant the position of the holographic recording medium and changing the angle between the signal light and the reference light; (2) a method (shift-multiplexed recoding method) comprising the step of applying signal light with a first incident angle and reference light with a second incident angle different from the first incident angle to a recording layer at the same time, wherein the multiplexed recording is performed by keeping constant the angle between the signal light and the reference light and relatively shifting at least one of a holographic recording medium and the signal and reference light; and (3) a method (wavelength-multiplexed recording method) comprising the step of applying signal light with a first incident angle and reference light with a second incident angle different from the first incident angle to a recording layer at the same time, wherein the multiplexed recording is performed by keeping constant the position of a holographic recording medium and changing the wavelength of the signal light and the reference light.

In the shift-multiplexed method, the relative distance between a first position where a first piece of information is recorded in the recording layer and a second different position where a second different piece of information is recorded is kept such that the relative distance becomes n times the distance (the reference amount of change) between the first position and a position where the intensity of the diffracted light from the first piece of information exhibits First Null, wherein n is an integer of at least 1.

In the wavelength-multiplexed recording method, the difference (the relative wavelength difference) between a first recording wavelength at which a first piece of information is recorded in the recording layer and a second different recording wavelength at which a second different piece of information is recorded is kept such that the above difference becomes n times the difference (the reference amount of change) between the first recording wavelength and a wavelength at which the intensity of the diffracted light from the first piece of information exhibits First Null, wherein n is an integer of at least 1.

In any multiplexed recording method other than the angle-multiplexed recording method and the shift-multiplexed recording method using the spherical reference wave, therefore, the relative distance is preferably twice the reference amount of change in the optical density αL range from 0.3 to 1.1 and preferably three times the reference amount of change in the optical density αL range of more than 1.1 to 2.0, in order that both high density recording and low bit error rate should be achieved at the same time.

What is claimed is:

1. A holographic recording method comprising:
applying light for recording or reproduction to a holographic recording medium comprising at least a recording layer with a thickness L which comprises a photorefractive index-changing material as a recording layer material, the recording layer material having an absorption coefficient α, wherein the optical density αL expressed by the product of the absorption coefficient α and the thickness L is in a range approximately from 0.3 to 2.0, wherein the recording is performed by simultaneously applying signal light at a first incident angle and reference light at a second incident angle different from the first incident angle to the recording layer, the reference light is applied at two or more different angles to the recording layer for the purpose of angle-multiplexed storage, and first reference light that enters the recording layer at a first angle forms an angle Δθ with second reference light that enters the recording layer at a second angle different from the first angle, wherein the angle Δθ (angular space) satisfies the formula:

$$\Delta\theta \geq n \cdot \lambda(L \cdot \sin\theta)$$

wherein Δθ represents an angular space (deg), n represents an integer of at least 2, λ represents the wavelength (μm) of the signal and reference lights applied at the time of recording, L represents the thickness (μm) of the recording layer, and θ represents an angle (deg) which the first reference light forms with the signal light applied to the recording layer at the time of information recording.

2. A holographic recording method comprising:
applying light for recording or reproduction to a holographic recording medium comprising at least a recording layer with a thickness L which comprises a photo-refractive index-changing material as a recording layer material, the recording layer material having an absorption coefficient α, wherein the optical density αL expressed by the product of the absorption coefficient α and the thickness L is in a range approximately from 0.3 to 2.0, wherein
the recording is multiplexed recording in which signal light at a first incident angle and reference light at a second incident angle different from the first incident angle are applied simultaneously to the recording layer,
the multiplexed recording is performed by: maintaining a constant angle formed between the signal light and the reference light; and relatively shifting at least one of the holographic recording medium and the signal and reference lights,
the optical density αL is in a range approximately from 0.3 to 1.1, and
a relative distance between a first place where a first piece of information is recorded in the recording layer and a second different place where a second piece of information is recorded therein is twice the distance (reference amount of change) between the first place and a place where the intensity of diffracted light from the first piece of information exhibits a First Null.

3. A holographic recording method comprising:
applying light for recording or reproduction to a holographic recording medium comprising at least a recording layer with a thickness L which comprises a photo-refractive index-changing material as a recording layer material, the recording layer material having an absorption coefficient α, wherein the optical density αL expressed by the product of the absorption coefficient α and the thickness L is in a range approximately from 3.0 to 2.0, wherein
the recording is multiplexed recording in which signal light at a first incident angle and reference light at a second incident angle different from the first incident angle are applied simultaneously to the recording layer,
the multiplexed recording is performed by: maintaining a constant angle formed between the signal light and the reference light; and relatively shifting at least one of the holographic recording medium and the signal and reference lights,
the optical density αL is in a range approximately from more than 1.1 to at most 2.0, and
a relative distance between a first place where a first piece of information is recorded in the recording layer and a second different place where a second piece of information is recorded therein is three times the distance between the first place and a place where the intensity of diffracted light from the first piece of information exhibits a First Null.

4. A holographic recording method comprising:
applying light for recording or reproduction to a holographic recording medium comprising at least a recording layer with a thickness L which comprises a photo-refractive index-changing material as a recording layer material, the recording layer material having an absorption coefficient α, wherein the optical density αL expressed by the product of the absorption coefficient α and the thickness L is in a range approximately from 0.3 to 2.0, wherein
the recording is performed simultaneously by applying signal light and reference light at an angle different from that of the signal light to the recording layer, wherein the reference light to passes through a lens to form a spherical reference wave with respect to the recording layer,
the spherical reference wave is applied every time the holographic recording medium is shifted by a constant distance in its surface direction for the purpose of shift-multiplexed storage, and
the constant distance δ (shift space) by which the holographic recording medium is shifted satisfies the formula:

$$\delta \geq n \cdot \lambda z_0/(L \cdot \sin\theta)$$

wherein λ represents the shift space (μm), n represents an integer of at least 2, λ represents the wavelength (μm) of the signal light and the spherical reference wave applied at the time of recording, θ represents an angle (deg) which the signal light forms with the center optical axis of the spherical reference wave, and $z_0$ represents the distance (μm) between the recording layer and the lens for forming the spherical wave.

* * * * *